(12) United States Patent
Esteban et al.

(10) Patent No.: US 11,695,300 B2
(45) Date of Patent: Jul. 4, 2023

(54) SYSTEMS AND METHODS FOR LOW POWER EXCITATION IN HIGH POWER WIRELESS POWER SYSTEMS

(71) Applicant: WiTricity Corporation, Watertown, MA (US)

(72) Inventors: Bryan Esteban, Watertown, MA (US); Milisav Danilovic, Watertown, MA (US); Kylee Devro Sealy, Providence, UT (US)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 17/556,309

(22) Filed: Dec. 20, 2021

(65) Prior Publication Data

US 2022/0115913 A1    Apr. 14, 2022

Related U.S. Application Data

(63) Continuation of application No. 17/507,510, filed on Oct. 21, 2021, which is a continuation of application
(Continued)

(51) Int. Cl.
*H02J 50/12* (2016.01)
*B60L 53/122* (2019.01)
(Continued)

(52) U.S. Cl.
CPC .......... *H02J 50/12* (2016.02); *B60L 53/122* (2019.02); *H02M 1/4208* (2013.01);
(Continued)

(58) Field of Classification Search
CPC . H02J 50/12; H02J 50/80; H02J 50/90; B60L 53/122; H02M 1/4208;
(Continued)

(56) References Cited

U.S. PATENT DOCUMENTS

| 5,640,082 A | 6/1997 | Lusher et al. |
| 5,757,599 A | 5/1998 | Crane |

(Continued)

FOREIGN PATENT DOCUMENTS

| CN | 103414255 A | 11/2013 |
| CN | 110103742 A | 8/2019 |

(Continued)

OTHER PUBLICATIONS

International Search Report—International Application No. PCT/US2017/048481, dated Dec. 6, 2017, together with the Written Opinion of the International Searching Authority, 11 pages.
(Continued)

*Primary Examiner* — Lincoln D Donovan
*Assistant Examiner* — Alex W Lam
(74) *Attorney, Agent, or Firm* — Goodwin Procter LLP

(57) ABSTRACT

Disclosed herein are systems and methods for low power excitation of wireless power transmitters configured to transmit high power. The exemplary systems and methods include disabling a power factor correction circuit of the transmitter, and adjusting one or more variable impedance components of the impedance network to obtain a minimum attainable impedance. The variable impedance components can be configured to operate between the minimum attainable impedance and a maximum attainable impedance. The systems and methods can include adjusting a phase shift angle associated with one or more transistors of the inverter and driving the transmitter such that the transmitter resonator coil generates a magnetic flux density less than or equal to a field safety threshold.

22 Claims, 15 Drawing Sheets

Related U.S. Application Data

No. 16/698,317, filed on Nov. 27, 2019, now Pat. No. 11,159,055.

(60) Provisional application No. 62/773,518, filed on Nov. 30, 2018.

(51) Int. Cl.
    *H02M 1/42*         (2007.01)
    *H02M 7/5387*     (2007.01)
    *H02J 50/80*      (2016.01)
    *H02J 50/90*      (2016.01)
    *H02M 1/08*       (2006.01)

(52) U.S. Cl.
CPC ......... *H02M 7/53871* (2013.01); *H02J 50/80* (2016.02); *H02J 50/90* (2016.02); *H02M 1/08* (2013.01)

(58) Field of Classification Search
CPC ..... H02M 7/53871; H02M 1/08; Y02T 90/14; Y02T 10/7072; Y02T 10/70
See application file for complete search history.

(56) References Cited

U.S. PATENT DOCUMENTS

| | | | |
|---|---|---|---|
| 5,784,269 A | 7/1998 | Jacobs et al. | |
| 6,037,745 A | 3/2000 | Koike et al. | |
| 6,483,730 B2 | 11/2002 | Johnson, Jr. | |
| 7,276,886 B2 | 10/2007 | Kinder et al. | |
| 7,333,349 B2 | 2/2008 | Chang et al. | |
| 7,440,300 B2 | 10/2008 | Konishi et al. | |
| 7,535,133 B2 | 5/2009 | Perreault et al. | |
| 8,830,710 B2 | 9/2014 | Perreault et al. | |
| 9,461,714 B2 | 10/2016 | Cook et al. | |
| 9,782,092 B2 | 10/2017 | Zhang | |
| 9,853,564 B2 | 12/2017 | Kang et al. | |
| 10,027,186 B2 | 7/2018 | Aikawa et al. | |
| 10,076,966 B2 | 9/2018 | Koizumi et al. | |
| 10,090,885 B2 | 10/2018 | Widmer et al. | |
| 10,141,788 B2 | 11/2018 | Karnstedt et al. | |
| 10,218,224 B2 | 2/2019 | Campanella et al. | |
| 10,343,535 B2 | 7/2019 | Cook et al. | |
| 10,418,841 B2 | 9/2019 | Danilovic et al. | |
| 10,461,587 B2 | 10/2019 | Sieber | |
| 10,651,688 B2 | 5/2020 | Karnstedt et al. | |
| 10,673,282 B2 | 6/2020 | Campanella et al. | |
| 11,017,942 B2 | 5/2021 | Rochford et al. | |
| 2003/0169027 A1 | 9/2003 | Croce et al. | |
| 2007/0064457 A1 | 3/2007 | Perreault et al. | |
| 2007/0222542 A1 | 9/2007 | Joannopoulos et al. | |
| 2008/0265995 A1 | 10/2008 | Okamoto et al. | |
| 2008/0278264 A1 | 11/2008 | Karalis et al. | |
| 2010/0141042 A1 | 6/2010 | Kesler et al. | |
| 2010/0237709 A1 | 9/2010 | Hall et al. | |
| 2010/0277006 A1 | 11/2010 | Urciuoli | |
| 2010/0295506 A1 | 11/2010 | Ichikawa | |
| 2011/0074346 A1 | 3/2011 | Hall et al. | |
| 2011/0116290 A1 | 5/2011 | Boys | |
| 2011/0193416 A1 | 8/2011 | Campanella et al. | |
| 2011/0196544 A1 | 8/2011 | Baarman et al. | |
| 2011/0260865 A1 | 10/2011 | Bergman et al. | |
| 2012/0112535 A1 | 5/2012 | Karalis et al. | |
| 2012/0139358 A1* | 6/2012 | Teggatz ............ H02J 50/90 307/104 |
| 2012/0287545 A1 | 11/2012 | Tran et al. | |
| 2013/0062966 A1 | 3/2013 | Verghese et al. | |
| 2013/0069441 A1 | 3/2013 | Verghese et al. | |
| 2014/0035704 A1 | 2/2014 | Efe et al. | |
| 2014/0049118 A1 | 2/2014 | Karalis et al. | |
| 2014/0091634 A1 | 4/2014 | Mayo et al. | |
| 2014/0152117 A1 | 6/2014 | Sankar | |
| 2014/0292092 A1 | 10/2014 | Ichinose et al. | |
| 2014/0361636 A1 | 12/2014 | Endo et al. | |
| 2014/0368052 A1 | 12/2014 | Norconk et al. | |
| 2015/0035372 A1 | 2/2015 | Aioanei | |
| 2015/0051750 A1 | 2/2015 | Kurs et al. | |
| 2015/0055262 A1 | 2/2015 | Lin | |
| 2015/0244179 A1 | 8/2015 | Ritter et al. | |
| 2015/0303703 A1 | 10/2015 | Hayashi et al. | |
| 2015/0319838 A1 | 11/2015 | Bhutta | |
| 2015/0357826 A1 | 12/2015 | Yoo et al. | |
| 2015/0372516 A1 | 12/2015 | Na et al. | |
| 2016/0079766 A1 | 3/2016 | Jeong et al. | |
| 2016/0084894 A1 | 3/2016 | Govindaraj et al. | |
| 2016/0218566 A1 | 7/2016 | Bunsen et al. | |
| 2016/0248243 A1 | 8/2016 | Yanagishima et al. | |
| 2016/0248275 A1 | 8/2016 | Okidan | |
| 2016/0254679 A1 | 9/2016 | Liu et al. | |
| 2016/0294221 A1 | 10/2016 | Maniktala | |
| 2016/0308393 A1 | 10/2016 | Kumar et al. | |
| 2016/0380555 A1 | 12/2016 | Kang et al. | |
| 2017/0093168 A1 | 3/2017 | Von Novak, III et al. | |
| 2017/0104365 A1 | 4/2017 | Ghosh et al. | |
| 2017/0117751 A1 | 4/2017 | Karnstedt et al. | |
| 2017/0126069 A1 | 5/2017 | Martin | |
| 2017/0256991 A1 | 9/2017 | Bronson et al. | |
| 2017/0324351 A1 | 11/2017 | Rochford | |
| 2017/0346343 A1 | 11/2017 | Atasoy et al. | |
| 2017/0358953 A1 | 12/2017 | Trudeau et al. | |
| 2018/0006566 A1 | 1/2018 | Bronson et al. | |
| 2018/0040416 A1 | 2/2018 | Lestoquoy | |
| 2018/0062421 A1 | 3/2018 | Danilovic et al. | |
| 2018/0090995 A1 | 3/2018 | Arasaki et al. | |
| 2018/0236879 A1* | 8/2018 | Elshaer ............... H02J 50/12 |
| 2019/0006888 A1 | 1/2019 | Hajimiri et al. | |
| 2019/0103767 A1 | 4/2019 | Lethellier | |
| 2019/0115837 A1* | 4/2019 | Fahlenkamp ..... H02M 3/33507 |
| 2019/0148916 A1 | 5/2019 | Yoo et al. | |
| 2019/0165611 A1 | 5/2019 | Miyazawa et al. | |
| 2019/0326743 A1 | 10/2019 | Govindaraj | |
| 2019/0341796 A1 | 11/2019 | Gu et al. | |
| 2020/0195164 A1 | 6/2020 | Zhan et al. | |
| 2020/0303926 A1 | 9/2020 | Yang | |
| 2020/0343715 A1 | 10/2020 | Kaeriyama | |
| 2020/0359468 A1 | 11/2020 | Jung et al. | |
| 2020/0381945 A1 | 12/2020 | Wang et al. | |
| 2021/0088567 A1 | 3/2021 | Guedon et al. | |
| 2021/0281099 A1 | 9/2021 | Wan | |
| 2021/0281112 A1 | 9/2021 | Danilovic et al. | |

FOREIGN PATENT DOCUMENTS

| | | |
|---|---|---|
| DE | 102014208991 A1 | 11/2014 |
| EP | 0609964 A2 | 8/1994 |
| EP | 2763279 A1 | 8/2014 |
| EP | 2947749 A1 | 11/2015 |
| EP | 3145047 A1 | 3/2017 |
| EP | 3203634 A1 | 8/2017 |
| EP | 3248270 A1 | 11/2017 |
| EP | 3407467 A1 | 11/2018 |
| GB | 1506633 A | 4/1978 |
| JP | H11127580 A | 5/1999 |
| JP | 5635215 B1 | 12/2014 |
| JP | 2015208150 A | 11/2015 |
| JP | 2015231306 A | 12/2015 |
| JP | 2016131447 A | 7/2016 |
| JP | 2018102054 A | 6/2018 |
| KR | 20170118573 A | 10/2017 |
| WO | WO-2001018936 A1 | 3/2001 |
| WO | WO-2013036947 A2 | 3/2013 |
| WO | WO-2015119511 A1 | 8/2015 |
| WO | WO-2016099806 A1 | 6/2016 |
| WO | WO-2017070009 A1 | 4/2017 |
| WO | WO-2018136885 A1 | 7/2018 |

OTHER PUBLICATIONS

International Search Report—International Application No. PCT/US2021/021209, dated Aug. 17, 2021, together with the Written Opinion of the International Searching Authority, 17 pages.

(56) References Cited

OTHER PUBLICATIONS

International Search Report and the Written Opinion of the International Searching Authority, PCT/US2017/033997, 9 pages, Sep. 12, 2017.
International Search Report and Written Opinion for PCT/US2019/059441 dated Feb. 18, 2020, 11 pages.
International Search Report and Written Opinion for PCT/US2019/063616 dated Mar. 11, 2020, 9 pages.
International Search Report and Written Opinion for PCT/US2020/034344 dated Oct. 28, 2020, 15 pages.
International Search Report and Written Opinion for PCT/US2020/048046 dated Oct. 8, 2020, 10 pages.
International Search Report—International Application No. PCT/US2017/054055 dated Dec. 21, 2017, together with the Written Opinion of the International Searching Authority, 12 pages.
Rivas, et al., Design Considerations for Very High Freguency dc-dc Converters, 37th IEEE Power Electronics Specialists Conference, Jun. 18-22, 2006, 11 pages, Jeju, Korea.
Rivas, et al., New Architectures for Radio-Freguency dc/dc Power Conversion, 2004 35th Annual IEEE Power Electronics Specialists Conference, 2004, 11 pages, Aachen, Germany.
U.S. Appl. No. 16/882,117 U.S. Pat. No. 11,489,332 Published as: US2020/0373768 A1, Protection Circuits for Wireless Power Receivers, May 22, 2020.
U.S. Appl. No. 16/882,136 Published as: US2020/0373752 A1, Protection Circuits for Wireless Power Receivers, May 22, 2020.
U.S. Appl. No. 16/671,828 U.S. Pat. No. 11,017,942 Published as: US 2020-0143982 A1, Systems and Methods for Determining Coil Current in Wireless Power Systems, Nov. 1, 2019.
U.S. Appl. No. 16/698,317 U.S. Pat. No. 11159055, Systems and Methods for Low Power Excitation in High Power Wireless Power Systems, Nov. 27, 2019.
U.S. Appl. No. 17/507,510 Published as: US2022/0103017 A1, Systems and Methods for Low Power Excitation in High Power Wireless Power Systems, Oct. 21, 2021.
U.S. Appl. No. 15/602,775 U.S. Pat. No. 10,804,742 Published as: US2017/0346343 A1, Voltage Regulation in Wireless Power Receivers, May 23, 2017.
U.S. Appl. No. 17/039,266 U.S. Pat. No. 11,349,342 Published as: US2021/0028652, Voltage Regulation in Wireless Power Receivers, Sep. 30, 2020.
U.S. Appl. No. 15/685,889 U.S. Pat. No. 10,418,841 Published as: US2018/0062421, Wireless Power Systems Having Interleaved Rectifiers, Aug. 24, 2017.
U.S. Appl. No. 16/543,090 U.S. Pat. No. 10,707,693 Published as: US2020/0044477, Wireless Power Systems Having Interleaved Rectifiers, Aug. 16, 2019.
U.S. Appl. No 17/003,800 U.S. Pat. No. 11,316,375 Published as: US2021/0066968 Control of Active Rectification in Wireless Power Systems, Aug. 26, 2020.
U.S. Appl. No. 17/700,243 Published as: US 2022-0285994 A1, Bidirectional Operation of Wireless Power Systems, Mar. 21, 2022.
U.S. Appl. No. 17/161,479 Published as: US 2021-0234365 A1, Systems and Methods for Auxiliary Power Dropout Protection, Jan. 28, 2021.
U.S. Appl. No. 17/161,487 Published as: US 2021-0234366 A1, Gate Driver Implementations for Safe Wireless Power System Operation, Jan. 28, 2021.
U.S. Appl. No. 17/155,855 U.S. Pat. No. 11,356,079 Published as: US 2021-0234534 A1, Tunable Reactance Circuits for Wireless Power Systems, Jan. 22, 2021.
U.S. Appl. No. 17/194,089 Published as: US 2021-0281112 A1, Active Rectification in Wireless Power Systems, Mar. 5, 2021.
U.S. Appl. No. 17/194,082 Published as: US 20210297004-A1, Active Rectification in Wireless Power Systems, Mar. 5, 2021.
U.S. Appl. No. 17/853,061, Systems and Methods for Pairing Wireless Power Transmitters and Receivers, Jun. 29, 2022.
U.S. Appl. No. 17/943,990, Systems and Methods for Pairing Wireless Power Receivers and Transmitters, Sep. 13, 2022.

* cited by examiner

SYSTEMS AND METHODS FOR LOW POWER EXCITATION IN HIGH POWER WIRELESS POWER SYSTEMS

CROSS-REFERENCE TO RELATED APPLICATIONS

This application is a continuation of U.S. patent application Ser. No. 17/507,510, filed Oct. 21, 2021 and titled "Systems and Methods For Low Power Excitation In High Power Wireless Power Systems," which is a continuation of U.S. patent application Ser. No. 16/698,317, filed Nov. 27, 2019 and titled "Systems and Methods For Low Power Excitation In High Power Wireless Power Systems" (now U.S. Pat. No. 11,159,055 issued on Oct. 26, 2021), which claims priority and benefit under 35 U.S.C. § 119(e) of U.S. Provisional Patent Application No. 62/773,518, titled "Systems and methods for low power excitation in high power wireless power systems" and filed on Nov. 30, 2018, the entire contents of each of which are hereby incorporated by reference herein.

TECHNICAL FIELD

The following disclosure is directed to methods and systems for low power excitation in wireless power systems and, more specifically, methods and systems for low power excitation of high-power wireless power transmitters.

BACKGROUND

Wireless power systems can include one or more wireless power transmitters configured to transmit power to one or more wireless power receivers via an oscillating electromagnetic field. Wireless power receivers can be coupled to one or more batteries such that the received power is used to charge the batteries. Wireless power systems can be configured to power various electronic devices (e.g., phones, laptops, medical devices, vehicles, robots, etc.).

SUMMARY

Wireless power systems may be specifically configured to transmit power in a particular power, current, and/or voltage range. This is because some electronic components that are used in wireless power systems in one power range may not be suitable or optimized for operating at another power range. For example, the transistors used in driving a wireless power transmitter at low power (e.g., on the order of milliWatts to tens of Watts) are typically not configured to handle higher levels of current or voltage to achieve higher levels of power transmission (e.g., on the order of hundreds of Watts to thousands of Watts). Therefore, such transistors will fail or be damaged if they operate outside of their power range. In another example, some electronic components, e.g., a power factor correction (PFC) circuit, may be beneficial in higher power systems but may introduce inefficiencies in lower power ranges. Therefore, it is not useful to use certain components when striving to achieve high-efficiency power transmission (e.g., greater than 90% from power source to load).

In some cases, configuring a wireless power system to operate in a particular power range (e.g., low power) can be challenging where the same wireless power system has been configured previously to operate in a significantly different power range (e.g., high power). Therefore, it may be beneficial for the wireless power system to operate in different power ranges (or "modes") and/or to switch between modes. Further, it can be beneficial for the wireless power system to do so without significant loss in efficiency and/or significant added cost or physical volume (e.g., due to additional or different electronic components). For example, it may be useful to operate a wireless power system in a "high-power mode" (e.g., configured for thousands of Watts) for charging a large-capacity battery (e.g., a vehicle battery) and, in some circumstances, in a "low-power mode" (e.g., less than 10 Watts) for certain functions, e.g., positioning between a wireless power transmitter and receiver coils, as described further herein. "High-power mode" may also be referred to as "wireless power transmission mode" or "WPT mode" herein.

In one aspect, the disclosure features methods for low power excitation of a wireless power transmitter configured to transmit high power. The transmitter includes an inverter coupled to an input of an impedance network and a transmitter resonator coil coupled to an output of the impedance network. The methods can include disabling a power factor correction circuit coupled proximate to an input of the inverter and adjusting one or more variable impedance components of the impedance network to obtain a minimum attainable impedance. The variable impedance components can be configured to operate between the minimum attainable impedance and a maximum attainable impedance. The methods can include adjusting a phase shift angle associated with one or more transistors of the inverter and driving the transmitter such that the transmitter resonator coil generates a magnetic flux density less than or equal to a field safety threshold.

Various embodiments of the exemplary methods can include one or more of the following features.

The wireless power transmitter can be configured to transmit high power between an operating frequency between 80 kHz and 90 kHz. The wireless power transmitter can be configured to transmit power at a power level between 500 W and 20,000 W. Driving the transmitter can be performed by a fixed low voltage source. Driving the transmitter can include driving the transmitter at 30 V or less. Driving the transmitter can include driving the transmitter at 50 W or less. The field safety threshold can be between 10 μTesla and 15 μTesla.

Adjusting the phase shift angle can include adjusting the phase shift angle between 0 degrees and 180 degrees such that the magnetic flux density is less than or equal to the field safety threshold. Adjusting the phase shift angle can include adjusting the phase shift such that a current in the transmitter resonator coil is less than or equal to a current limit. The current limit can be based on the field safety threshold. Driving the transmitter can include driving the transmitter such that a current in the transmitter resonator coil is less than or equal to a current limit. The current limit can be based on the field safety threshold. The current limit can be 2 Amperes. The current limit can be 355 milliAmperes. The methods can include determining the magnetic flux density based on an induced voltage or an induced current in one or more measurement coils, in which the measurement coils can be separate from the transmitter resonator coil; and providing a signal representative of the magnetic flux density to a controller coupled to the transmitter. Prior to driving the transmitter, the methods can include receiving a signal indicative of a presence of a vehicle having the receiver resonator coil near the transmitter resonator coil. The methods can include receiving a signal indicative of a presence of a vehicle having the receiver resonator coil near the transmitter resonator coil.

In another aspect, the disclosure can feature systems for low power excitation of a wireless power transmitter configured to transmit high power. The systems can include a power factor correction circuit configured to be enabled during transmission of high power and disabled during low power excitation; and a low voltage source coupled to an output of the power factor correction circuit and configured to drive the transmitter such that, during low power excitation, a resonator coil of the transmitter generates a magnetic flux density less than or equal to a field safety threshold. The systems can include an inverter coupled to an output of the low voltage source and comprising at least two transistors, the transistors configured to be controlled such that a phase shift angle of each transistor is adjustable during low power excitation; and at least one variable impedance component coupled to an output of the inverter and configured to be adjusted to obtain a minimum attainable impedance during low power excitation. The variable impedance components can be configured to operate between the minimum attainable impedance and a maximum attainable impedance.

Various embodiments of the exemplary systems can include one or more of the following features.

The wireless power transmitter can be configured to transmit high power between an operating frequency between 80 kHz and 90 kHz. The wireless power transmitter can be configured to transmit power at a power level between 500 W and 20,000 W. The wireless power transmitter can be configured to output power at 50 W or less during low power excitation. The field safety threshold can be between 10 µTesla and 15 µTesla. The systems can include a current sensor coupled to the transmitter resonator coil and configured to provide a signal representative of a current characteristic to a controller of the transmitter. The controller can be operably coupled to at least one of: (i) the at least two transistors or (ii) the at least one variable impedance component. The low power voltage source can be configured to drive the transmitter such that, during low power operation, a current in the transmitter resonator coil is less than or equal to a current limit. The current limit can be based on the field safety threshold.

In another aspect, the disclosure features methods for low power excitation of a high-power wireless power transmitter. The transmitter can include an inverter coupled to an input of an impedance network and a transmitter resonator coil coupled to an output of the impedance network. The methods can include disconnecting a power factor correction circuit from an input of the inverter; and adjusting one or more variable impedance components of the impedance network to obtain a minimum attainable impedance. The variable impedance components can be configured to operate between the minimum attainable impedance and a maximum attainable impedance; and driving the transmitter such that the transmitter resonator coil generates a magnetic flux density less than or equal to a field safety threshold.

Various embodiments of the exemplary methods can include one or more of the following features.

The field safety threshold can be between 10 µTesla and 15 µTesla. Driving the transmitter can include driving the transmitter such that a current in the transmitter resonator coil is less than or equal to a current limit, in which the current limit based on the field safety threshold. The current limit can be 2 Amperes. The current limit can be 355 milliAmperes. The methods can include determining the current in the transmitter resonator coil; and adjusting a voltage source of the transmitter based on the determined current. The methods can include determining the magnetic flux density by determining induced voltage or induced current in one or more sensing coils, in which the sensing coils separate from the transmitter resonator coil. Driving the transmitter can include driving the transmitter based on the determined magnetic flux. The methods can include receiving a signal indicative of a presence of a vehicle having the receiver resonator coil near the transmitter resonator coil.

In another aspect, the disclosure features methods for low power excitation of a wireless power transmitter configured to transmit high power. The transmitter can include an inverter coupled to an input of an impedance network and a transmitter resonator coil coupled to an output of the impedance network. The methods can include configuring a power factor correction circuit to output a minimum bus voltage, in which the power factor correction circuit coupled proximate to an input of the inverter. The methods can include adjusting one or more variable impedance components of the impedance network to obtain a minimum attainable impedance, in which the variable impedance components can be configured to operate between the minimum attainable impedance and a maximum attainable impedance; and adjusting a phase shift angle associated with one or more transistors of the inverter such that the transmitter resonator coil generates a magnetic flux density less than or equal to a field safety threshold.

Various embodiments of the exemplary methods can include one or more of the following features.

The minimum bus voltage can be approximately 380 V. The field safety threshold can be between 10 µTesla and 15 µTesla. Adjusting the phase shift angle can include adjusting the phase shift such that a current in the transmitter resonator coil is less than or equal to a current limit, the current limit based on the field safety threshold. The current limit can be 2 Ampere. The current limit can be 355 milliAmperes. The methods can include determining the magnetic flux density by determining induced voltage or induced current in one or more measurement coils, in which the coils separate from the transmitter resonator coil. Adjusting a phase shift angle can include adjusting a phase shift angle based on the determined magnetic flux.

In another aspect, the disclosure features methods for low power excitation of a wireless power transmitter configured to transmit high power with a low power, in which the transmitter includes an inverter coupled to an input of an impedance network and a transmitter resonator coil coupled to an output of the impedance network. The methods can include disabling a power factor correction circuit coupled proximate to an input of the inverter; and adjusting one or more variable impedance components of the impedance network to obtain a minimum attainable impedance, in which the variable impedance components are configured to operate between the minimum attainable impedance and a maximum attainable impedance. The methods can include driving the transmitter such that the transmitter resonator coil generates a magnetic flux density less than or equal to a field safety threshold.

Various embodiments of the exemplary methods can include one or more of the following features.

A phase shift angle associated with one or more transistors of the inverter can be fixed. Driving the transmitter can be performed by a variable low voltage source. Driving the transmitter can include driving the transmitter with a voltage between 1 V and 10 V. The field safety threshold can be between 10 µTesla and 15 µTesla. Adjusting the phase shift angle can include adjusting the phase shift such that a current in the transmitter resonator coil is less than or equal to a current limit, in which the current limit based on the field safety threshold. The current limit can be 2 Ampere. The current limit can be 355 milliAmperes. The methods can include determining the magnetic flux density by determining induced voltage or induced current in one or more measurement coils, the coils separate from the transmitter resonator coil. Driving the transmitter can include driving the transmitter based on the determined magnetic flux.

DETAILED DESCRIPTION

Disclosed herein are exemplary embodiments of systems and methods for the low power excitation (LPE) in wireless power systems and, in particular, in high-power wireless power systems that include high-power wireless power transmitters.

Wireless Power Systems

Figure 1A:
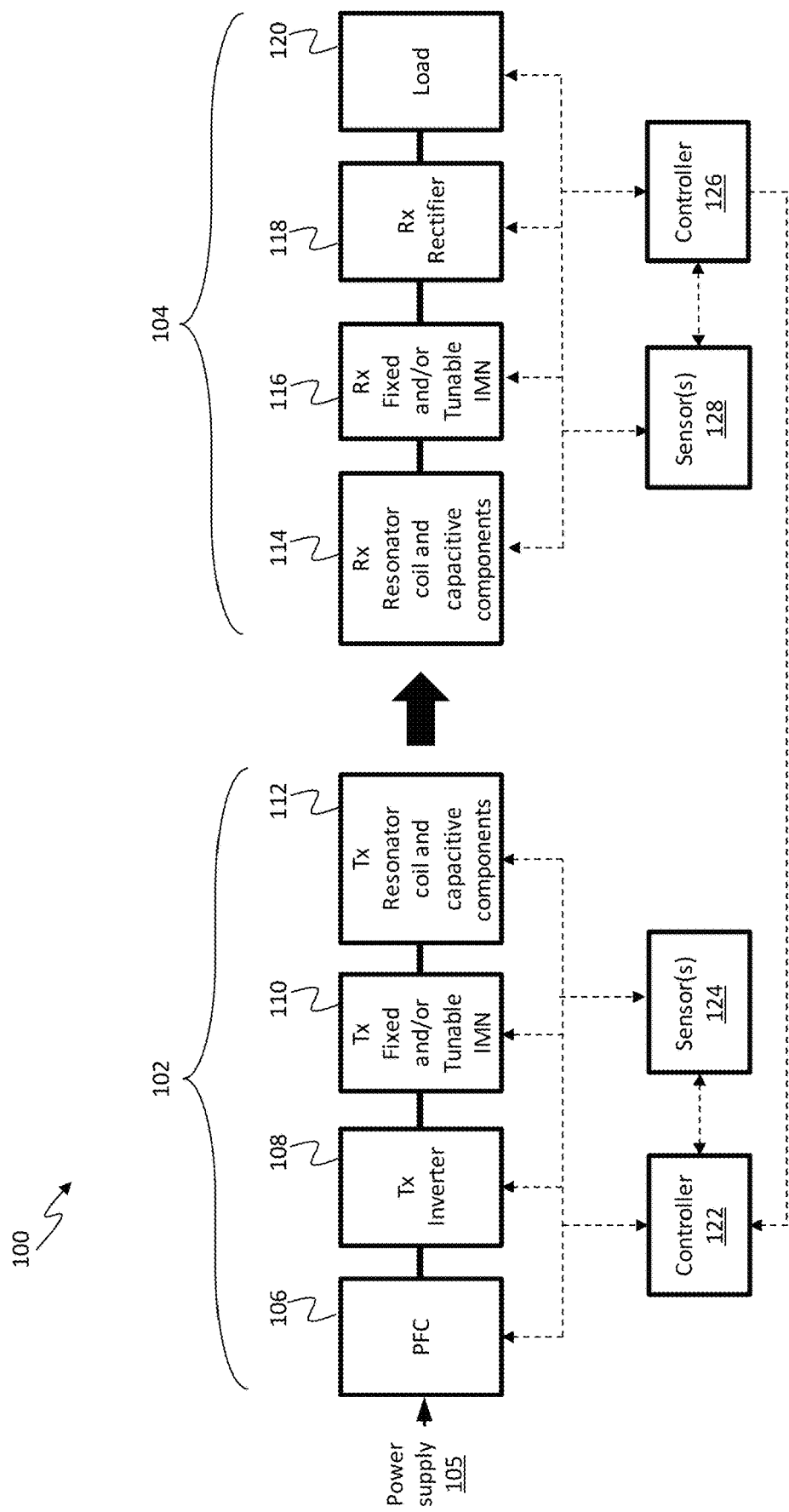
FIG. 1A is a block diagram of an exemplary wireless power system.

FIG. 1A is a block diagram of an exemplary wireless power system 100. The system 100 includes a wireless power transmitter 102 and a wireless power receiver 104. In transmitter 102, a power supply 105 (e.g., AC mains, battery, etc.) provides power to an inverter 108. Additional components can include power factor correction (PFC) circuit 106 before the inverter stage 108. The inverter 108 drives the transmitter resonator coil and capacitive components 112 ("resonator"), via an impedance matching network 110 (including fixed and/or tunable network components). The resonator 112 produces an oscillating magnetic field which induces a current and/or voltage in receiver resonator 114. The received energy is provided to a rectifier 118 via impedance matching network 116 (including fixed and/or tunable network components). Ultimately, the rectified power is provided to a load 120 (e.g., one or more batteries of an electric or hybrid vehicle). In some embodiments, the battery voltage level can impact various parameters (e.g., impedance) of the wireless power system 100. Therefore, the battery voltage level may be received, determined, or measured to be provided as input to other portions of the wireless power system 100. For example, typical battery voltage ranges for electric vehicles include 0-280 V, 0-350 V, 0-420 V, etc.

In some embodiments, one or more components of the transmitter 102 can be coupled to a controller 122, which may include a communication module (e.g., Wi-Fi, radio, Bluetooth, in-band signaling mechanism, etc.). In some embodiments, one or more components of the transmitter 102 can be coupled to one or more sensors 124 (e.g., a current sensor, a voltage sensor, a power sensor, a temperature sensor, a fault sensor, etc.). The controller 122 and sensor(s) 124 can be operably coupled to control portions of the transmitter 102 based on feedback signals from the sensor(s) 124.

In some embodiments, one or more components of the receiver 104 can be coupled to a controller 126, which may include a communication module (e.g., Wi-Fi, radio, Bluetooth, in-band signaling mechanism, etc.). In some embodiments, one or more components of the transmitter 104 can be coupled to one or more sensors 128 (e.g., a current sensor, a voltage sensor, a power sensor, a temperature sensor, a fault sensor, etc.). The controller 126 and sensor(s) 128 can be operably coupled to control portions of the transmitter 102 based on feedback signals from the sensor(s) 124.

Examples of wireless power systems can be found in U.S. Patent Application Publication No. 2010/0141042, published Jun. 10, 2010 and titled "Wireless energy transfer systems," and U.S. Patent Application Publication No. 2012/0112535, published May 10, 2012 and titled "Wireless energy transfer for vehicles," both of which are hereby incorporated by reference in their entireties.

In some embodiments, the exemplary impedance matching networks 110, 116 can include one or more variable impedance components. The one or more variable impedance components may be referred together herein as a "tunable matching network" (TMN). TMNs can be used in adjusting the impedance (e.g., including the reactance) of the wireless power transmitter 102 and/or receiver 104. In some embodiments, tunable matching network(s) may referred to as "tunable reactance circuit(s)". In some applications, e.g., wireless power transmission, impedances seen by the wireless power transmitter 102 and receiver 104 may vary dynamically. In such applications, impedance matching between a receiver resonator coil (of 114) and a load 120, and a transmitter resonator coil (of 112) and the power supply 105, may be required to prevent unnecessary energy losses and excess heat. The impedance experienced by a resonator coil may be dynamic, in which case, a dynamic impedance matching network can be provided to match the varying impedance to improve the performance (e.g., efficiency, power delivery, etc.) of the system 100. In the case of the power supply 105 in a wireless power system 100, the impedances seen by the power supply 105 may be highly variable because of changes in the load 120 receiving power (e.g., battery or battery charging circuitry) and changes in the coupling between the transmitter 102 and receiver 104 (caused, for example, by changes in the relative position of the transmitter and receiver resonator coils). Similarly, the impedance experienced by the receiver resonator 114 may also change dynamically because of changes in the load 120 receiving power. In addition, the desired impedance matching for the receiver resonator 114 may be different for different coupling conditions and/or power supply conditions. Accordingly, power transmission systems transmitting and/or receiving power via highly resonant wireless power transfer, for example, may be required to configure or modify impedance matching networks 110, 116 to maintain efficient power transmission. One or more components of the TMN can be configured to present an impedance between a minimum impedance and a maximum impedance attainable by the particular components. In various embodiments, the attainable impedance can be dependent on the operating frequency (e.g., 80 kHz to 90 kHz) of the wireless power system 100. This may performed continuously, intermittently, or at certain points in power transmission (e.g., at the beginning of power transmission). Examples of tunable matching networks can be found in U.S. Patent Application Publication No. 2017/0217325, published Aug. 3, 2017 and titled "Controlling wireless power transfer systems," and U.S. Patent Application Publication No. 2017/0229917, published Aug. 10, 2017 and titled "PWM capacitor control," both of which are hereby incorporated by reference in their entireties.

High-power wireless power transmitters can be configured to transmit wireless power in applications such as powering of and/or charging a battery of vehicles, industrial machines, robots, or electronic devices relying on high power. For the purpose of illustration, the following disclosure focuses on wireless power transmission for vehicles. However, it is understood that any one or more of the embodiments described herein can be applied to other applications in which wireless power can be utilized.

Low Power Excitation (LPE) Overview

"Low power excitation," as used herein, can include driving a wireless power transmitter with a relatively low power, current, and/or voltage. As discussed above, low power excitation can be particularly challenging in wireless power transmitters configured to operate at high power (e.g., 500 W-20,000 W or greater).

In an exemplary embodiment, low power excitation of high power transmitters can be used in positioning a vehicle having a wireless power receiver 104 over a wireless power transmitter 102 (refer to FIG. 8 and section with heading "Vehicle Positioning" below). In particular, properly positioning a receiver resonator coil over a transmitter resonator coil can be important for maximizing transmitted power to the receiver 104 and/or for maximizing efficiency of power transmission. Examples of vehicle positioning systems and methods can be found in U.S. Patent Application Publication No. 2018/0056800, published on Mar. 1, 2018 and titled "Relative position determination and vehicle guidance in wireless power transfer systems"; U.S. Pat. No. 10,461,587, issued on Oct. 29, 2019 and titled "Methods and apparatus for positioning a vehicle using foreign object detection"; U.S. Pat. No. 10,343,535, issued on Jul. 9, 2019 and titled "Wireless power antenna alignment adjustment system for vehicles"; and U.S. Pat. No. 10,090,885, issued on Oct. 2, 2018 and titled "Antenna alignment and vehicle guidance for wireless charging of electric vehicles"; the entireties of each of which are incorporated herein by reference.

Figure 1B:
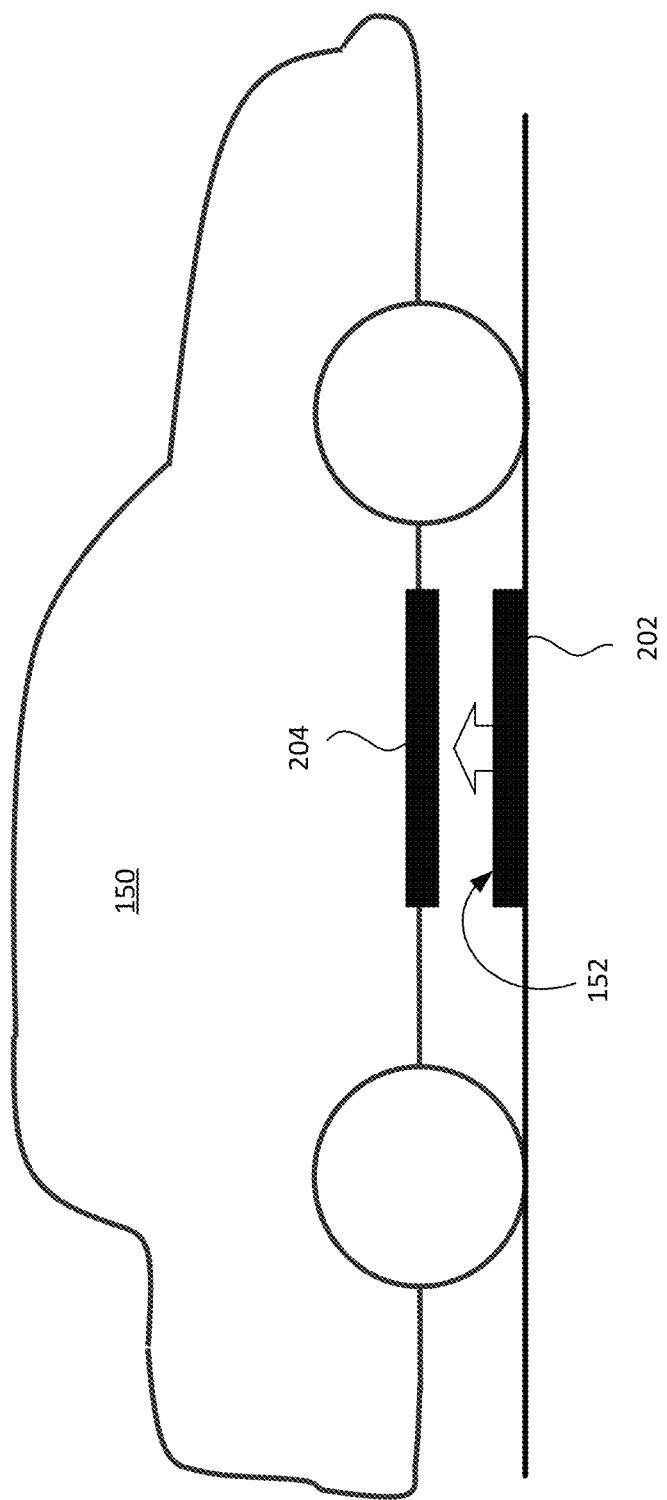
FIG. 1B is a diagram of a vehicle having an exemplary receiver resonator coil positioned over a transmitter resonator coil.

FIG. 1B illustrates a vehicle 150 having an exemplary receiver resonator coil 204 positioned over a transmitter resonator coil 202. In wireless power transmission (WPT) mode, the transmitter resonator coil 202 is typically energized at a high power (e.g., on the order of thousands of Watts) for the purposes of transmitting power to the receiver coil 204 via an electromagnetic field, ultimately charging the battery of the vehicle 150. In low power excitation (LPE) mode, the transmitter resonator coil 202 can be energized at low power (e.g., on the order of one Watt or tens of Watts) thereby creating a low-energy magnetic field. As discussed herein, in various embodiments, this low-energy magnetic field can be used for vehicle positioning or alignment.

In some embodiments, the wireless power transmitter 102 may be in LPE mode before being in wireless power transmission (WPT) mode. For example, once the vehicle 150 is guided to a desirable parking position, the transmitter 102 may switch from LPE mode to WPT mode to begin charging the battery of the vehicle 150. In some embodiments, if the vehicle 150 is moved during WPT mode, the transmitter 102 may enter LPE mode (e.g., interrupting WPT mode) to determine whether the vehicle 150 (and therefore the receiver 104) should be re-positioned relative to the transmitter 102. For example, the vehicle 150 and receiver 104 may be moved if the vehicle 150 is weighed down by cargo in the trunk or a passenger sitting in the vehicle 150. Additional examples are illustrated in FIG. 8 and described in the below section with heading "Vehicle Positioning".

In some embodiments, before a wireless power receiver 104 is positioned over or near the transmitter 102, the field generated by the wireless power transmitter 102 may be exposed to its environment, including humans, animals, etc. In some embodiments, the receiver may be positioned over or near the transmitter 102 but power transmission may not initiate before the receiver 102 is aligned to the transmitter 102. In such cases, a wireless power transmitter 102 can be driven such that the magnetic flux density generated by the transmitter resonator coil 202 is less than or equal to a field safety threshold, e.g., less than 10 µTeslas, less than 25 µTeslas, less than 50 µTeslas, etc. In some embodiments, the field safety threshold is between 10-15 µTeslas. This field safety threshold may be determined based on limits on field exposure to humans and/or electromagnetic compatibility (EMC) concerns.

In some embodiments, the magnetic flux density may be determined at a surface of the transmitter resonator coil 202 facing the receiver resonator coil 204. For example, the magnetic flux density may be determined at the surface 152 of the packaging of the transmitter resonator coil 202. For example, a transmitter resonator coil 202 can be packaged or housed in a material (e.g., a non-conductive material including plastic, rubber, etc.) to protect the electronic components from the environment and/or provide safety for humans or animals. In some embodiments, the magnetic flux density may be determined at a specified distance and/or angle from the surface 152 of the transmitter resonator coil 202 or packaging thereof. In some embodiments, to meet the field safety threshold, the transmitter 102 may be driven such that the current in the transmitter resonator coil 202 is limited to less than or equal to 2 Amperes, less than or equal to 1 Ampere, or less. In some embodiments, to meet the field safety threshold, the transmitter 102 may be driven such that the current in the transmitter resonator coil 202 is limited to less than or equal to 325 milliAmperes rms+/−9% (e.g., less than a value between 295-355 milliA$_{RMS}$). In some embodiments, the transmitter 102 can be driven with low power in the range of 1 W to 50 W.

In LPE mode, the receiver resonator coil 204 or another coil positioned on or near the receiver resonator coil 204 can "pick up" the low-energy magnetic field generated by the transmitter resonator coil 202. In some embodiments, by picking up the magnetic field, the wireless power system 100 (or a device coupled to or coordinated with the pick-up coil) can determine a strength of the field to determine whether the receiver resonator coil 204 is in a sufficiently high coupling position relative to the transmitter resonator coil 202, so as to enable efficient power transmission and/or maximum power delivery.

In some embodiments, by determining coupling between the transmitter resonator coil 202 and receiver resonator coils 204, the system can determine whether the receiver resonator coil 204 is optimally positioned relative to the transmitter resonator coil 202. In some instances, a high coupling position may be realized when coupling between the receiver resonator coil 204 and the transmitter resonator coil 202 is high enough to enable efficient high power transmission to a vehicle's battery (e.g., with efficiency greater than 90% from power source to battery). In other instances, the strength of the field in combination with known geometries of the wireless power system and/or the pick-up coil can be used to further determine if a high coupling position is a safe position (e.g., for EMF exposure, equipment operation, etc.) for the transmitter 102 to transfer power. In some embodiments, the current in the transmitter resonator coil 202 can be determined and, in some cases, maintained at a constant level for the range of coupling positions. In some cases, by maintaining constant current in the transmitter resonator coil 202, the determination of coupling is simplified (e.g., by holding the variable of coil current constant). With such information, the system 100 (or a separate positioning system) can notify and/or guide the vehicle or the user of the vehicle to a desired relative position based on safety, efficiency, coupling, or any other system parameter (whether or not such a position is also a relative maximum coupling position).

In some embodiments, one or more sensing coils (e.g., 2, 3, 4, 6, 8, or more) may be positioned on or near the vehicle 150 and/or receiver 104 to pick up magnetic flux generated by transmitter 102. The sensing coils can be coupled to a processor configured to determine the magnetic flux density at the sensing coil or relative magnetic flux density between two or more sensing coils. The received voltage and/or compensated current (e.g., shorted directly or through another element such as an inductor, capacitor, or resistor) can be used to determine the location of relative magnetic flux densities (e.g., relative to the surface of the resonator coil). In some embodiments, multiple coils may be sized, shaped, positioned, oriented, and/or connected to each other so as to produce a voltage and/or compensated current near 0 V or 0 A, respectively, to determine if such positioned coils are sufficiently distributed relative to the transmitter resonator coil 204.

Figure 2B:
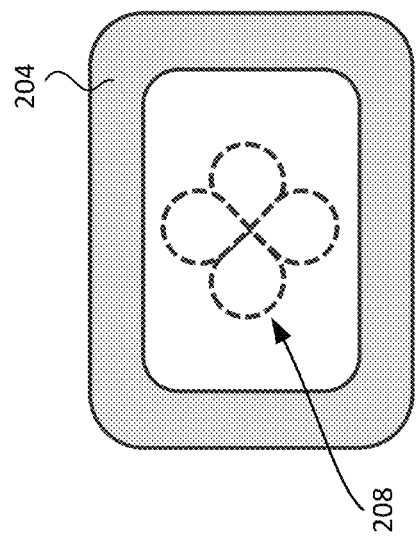
FIGS. 2A-2D are diagrams of exemplary coil configurations.
Figure 2D:
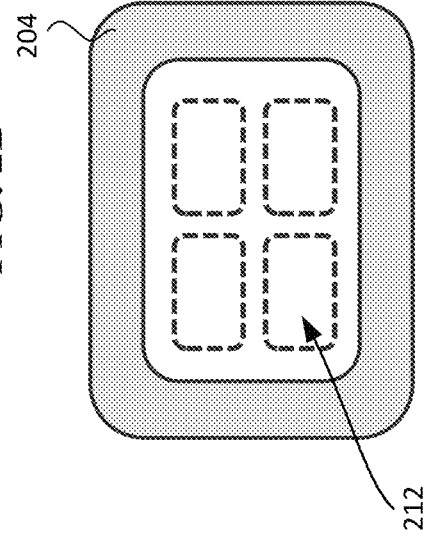
Figure 2A:
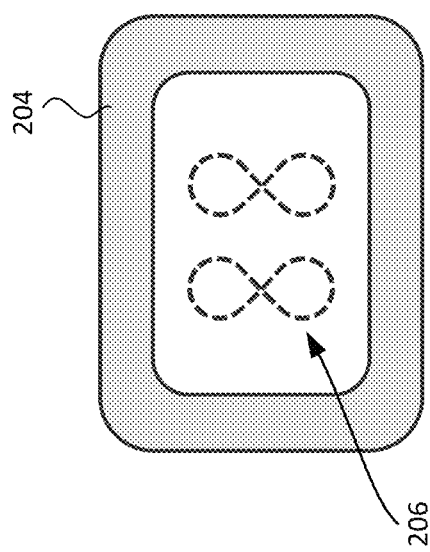
Figure 2C:
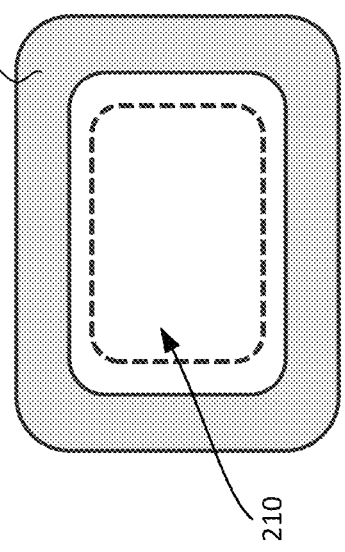

FIGS. 2A-2D illustrate exemplary sensing coil geometries relative to an exemplary wireless power receiver resonator coil 204. Examples may include two (2) coils 206 in a "figure-8" series of loops (see FIG. 2A) or four (4) coils 208 in a clover-leaf pattern in which the sensing coils are in alternating directions (see FIG. 2B). Other examples may use an odd or even number of multiple coils. FIG. 2C illustrates an example of a single coil 210 concentric with the receiver resonator coil 204. FIG. 2D illustrates multiple coils 212 distributed relative to the receiver resonator coil 204. It is understood that a separate coil or multiple coils can be positioned so as to provide additional geometric information of the magnetic flux density for positioning and/or other purposes. For example, the use of multiple coils (e.g., coils 206, 208, 212) may provide specific information about the location of the magnetic flux density as compared to a single coil. In another example, the positioning of one or more coils may provide specific information about the location of the magnetic flux density. It is also understood that the examples of coil configurations provided herein are not intended to be limiting and other coil configurations are within the scope of this disclosure.

In some embodiments, to achieve a current of less than or equal to 2 Amperes in the transmitter resonator coil 202 and/or achieve an electromagnetic field less than or equal to the field safety threshold generated by the transmitter coil 202, any one or more of the following parameters of the transmitter 102 can be included and/or adjusted:

Driving voltage. In various embodiments, the transmitter 102 may include a driving circuit configured to produce a relatively low voltage (e.g., less than 20 V, less than 10 V, less than 5 V, etc.). For example, the driving circuit of the transmitter 102 can be configured to apply a voltage of approximately 5 V at the input of the matching network 110 after the inverter 108. This may produce a similar voltage at the transmitter resonator coil 202. In some embodiments, the driving circuit include one or more of a fixed voltage source, a variable voltage source, a DC-to-DC converter, a fly-back converter, or a low-dropout (LDO) regulator with a reference voltage. It is understood that other types of voltage sources may be used to drive the transmitter 102. In some embodiments, the voltage source may be switched in and out of the transmitter 102 or may be a fixed part of the transmitter's circuitry. In some embodiments, the inverter 108 and/or PFC circuit 106 can be configured to drive the transmitter 102 to produce the low voltage.

Figure 3:
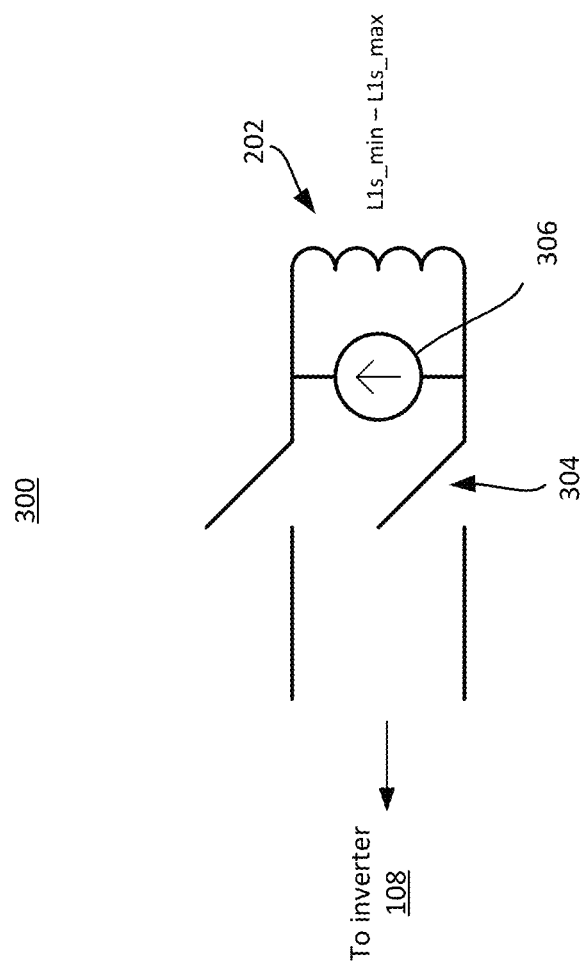
FIG. 3 is a schematic of a portion of an exemplary wireless power transmitter configured for low-power excitation (LPE).

Driving current. In various embodiments, a driving current of the transmitter 102 can be adjusted by varying the driving voltage and determining the current in the transmitter 102 (e.g., via a feedback mechanism such as a current sensor). In some embodiments, the transmitter 102 may include a driving current mechanism to produce the driving current (see, e.g., FIG. 3). FIG. 3 is a schematic of a portion 300 of a wireless power transmitter 102 configured for low-power excitation. In this embodiment, the transmitter resonator coil 202 can be (i) disconnected from the inverter 108 via switches 304, and (ii) driven by a current source 306 to produce a coil current of less than 2 Amperes.

TMN impedance. In various embodiments, the TMN (as part of matching network 110) in the transmitter 102 may be adjusted such that it presents a particular impedance. The TMN can be adjusted so as to present an impedance between a minimum attainable impedance and a maximum attainable impedance. In particular, components of the TMN may be adjusted to present a minimum impedance (e.g., minimum inductive reactance or minimum positive reactance) attainable by the particular TMN to the driving circuit of the transmitter 102. The driving circuit can include components of the transmitter 102 before the matching network 110 in the power path, including inverter 108, PFC circuit 106, and/or any other driving circuit (e.g., one or more LPE circuit components as described herein). In some embodiments, the minimum attainable impedance is pre-determined for the particular wireless power system 100 based on the particular specifications of the components selected in the TMN. In some embodiments, a controller 122 of the wireless power transmitter 102 can determine the minimum attainable impedance for the TMN. For example, the controller 122 can send a signal to the adjustable components with settings to attain a specific impedance.

In some embodiments, to attain the desired impedance, one or more switches (e.g., field effect transistors (FETs), metal-oxide semiconductor FETs (MOSFETs), etc.) of the TMN may be adjusted such that the switches are fully open and present the maximum capacitive (e.g., negative) reactance attainable by the particular TMN, thereby reducing the impedance of the branch having the TMN (see, e.g., upper and/or lower branch of component 406). When the TMN FETs are fully open throughout the switching cycle, the TMN's effective capacitive reactance will be at its minimum value (put another way, at its largest negative value). When the capacitive reactance is summed with the inductive reactance of the fixed inductor in series with the TMN, it results in the smallest impedance attainable for the X3 branch. Attaining a low or minimum impedance can have the effect of minimizing variation in the coil current in transmitter resonator coil 202 over coupling range of the resonator coils. As discussed above, coupling range can be based on one or more positions of the receiver resonator coil 204 relative to the transmitter resonator coil 202. Another advantage of adjusting the TMN to obtain a minimum inductive reactance can include the minimization the amount of control necessary to produce the desired current level in the transmitter resonator coil.

Inverter phase shift angle. The phase shift angle of the inverter 108 of the transmitter 102 can be adjusted by a controller 122 coupled to the inverter 108. Specifically, a pulse width modulation (PWM) generator (see, e.g., generator 422) of the controller 122 can be configured to control the gate drivers (see, e.g., drivers 418) coupled to the transistors of the inverter 108 to produce a desired phase shift angle. The inverter phase shift can include the application of a controllable delay between the complimentary PWM pairs (e.g., signals PWM1 and PWM2) driving transistors Q1 and Q2 and the complimentary PWM pairs (e.g., signals PWM3 and PWM4) driving transistors Q3 and Q4. The delay can range from 0 to 180 degrees. When the phase shift angle is 0 degrees, the inverter output voltage is zero because the output becomes shorted by either (i) transistors Q1 and Q3 being on simultaneously or (ii) transistors Q2 and Q4 being on simultaneously.

The phase shift angle can depend on the specific wireless power system components and parameters, including DC voltage bus, particular impedance matching, etc. In some embodiments, phase shift angle may be defined via two conventions. Specifically, in the first convention, when the phase angle is at zero (0) degrees, the coil current may be at or near its maximum level attainable by the particular transmitter 102 and when the phase angle is at 180 degrees, the coil current may be at or near zero. In the second convention (opposite the first convention), when the phase angle is at 180 degrees, the coil current may be at or near its maximum level attainable by the particular transmitter 102 and when the phase angle is at zero (0) degrees, the coil current may be at or near zero. For example, using the second convention, if the phase shift angle is about 5 degrees, the coil current may be at a low level. In some embodiments, a combination of the duty cycle and the inverter phase angle can be varied to improve switching behavior and thereby reduce ringing, reduce harmonics, increase or decrease body diode conduction, and/or reduce switching losses, etc.

Pulse width modulation (PWM). In some embodiments, the PWM generator (see, e.g., generator 422) of controller 122 can adjust the pulse width or duty cycle in one or more transistors of the inverter 108 to attain a desired voltage level in the transmitter resonator coil 202.

Power factor correction (PFC). The PFC circuit 106 may be enabled or disabled, or adjusted to produce a specific bus voltage $V_{BUS}$.

The following are exemplary values for driving voltage $V_{BUS}$ (V) and peak coil current $I_{s1}$ ($A_{PEAK}$) and root-mean-square coil current $I_{s1}$ ($A_{RMS}$):

TABLE 1

Exemplary values for the driving voltage and transmitter resonator coil current.

| Transmitter resonator coil inductance value | $V_{BUS}$ (V) | $I_{s1}$ ($A_{PEAK}$) | $I_{s1}$ ($A_{RMS}$) |
| --- | --- | --- | --- |
| L1s_min | 5 | 1.90 | 1.34 |
| L1s_max | 5 | 1.36 | 0.964 |

In some embodiments, the voltage on the transmitter resonator coil 202, one or more field sensors, or one or more sense coils can be used to measure the field level of the electromagnetic field from the transmitter resonator coil 202 and can be fed into the control system (see, e.g., control system 412, 506, 604, 708). The voltage feedback can be used to adjust one or more of the transmitter's components and/or parameters (e.g., power, voltages, and/or currents) to set the desired field level. For example, the transmitter 102 may include a current sensor (see, e.g., current sensor 416) configured to determine one or more current characteristics (e.g., level, frequency, phase, etc.) in the transmitter 102. The current reading can be provided to the control system (e.g., control system 412, 506, 604, 708) as feedback and used to adjust one or more of transmitter components and/or parameters, as described above. This feedback mechanism may be used alone or in combination with other sensors such as current sensor(s) and/or voltage sensor(s).

In the following description, systems and corresponding methods for low-power excitation are discussed together for clarity and conciseness. For example, system 400 for low-power excitation is discussed together with method 450 for low-power excitation. Note that the order of steps of each method described herein is intended to illustrate exemplary embodiments and may be executed or performed in another order or combination to achieve the desired output.

LPE—First Exemplary Embodiment

Figure 4A:
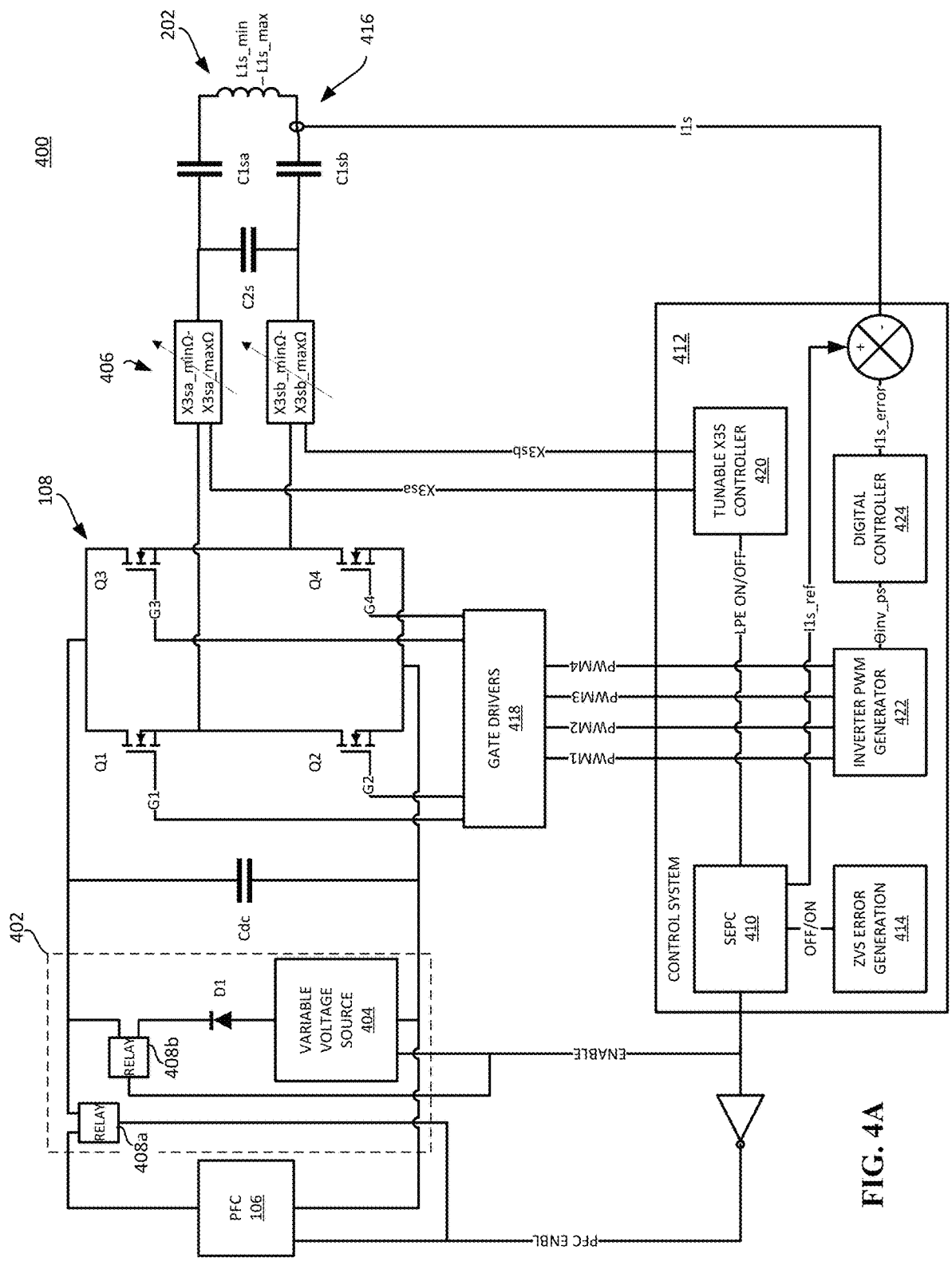
FIG. 4A is a schematic of an exemplary wireless power transmitter configured for low-power excitation.
Figure 4B:
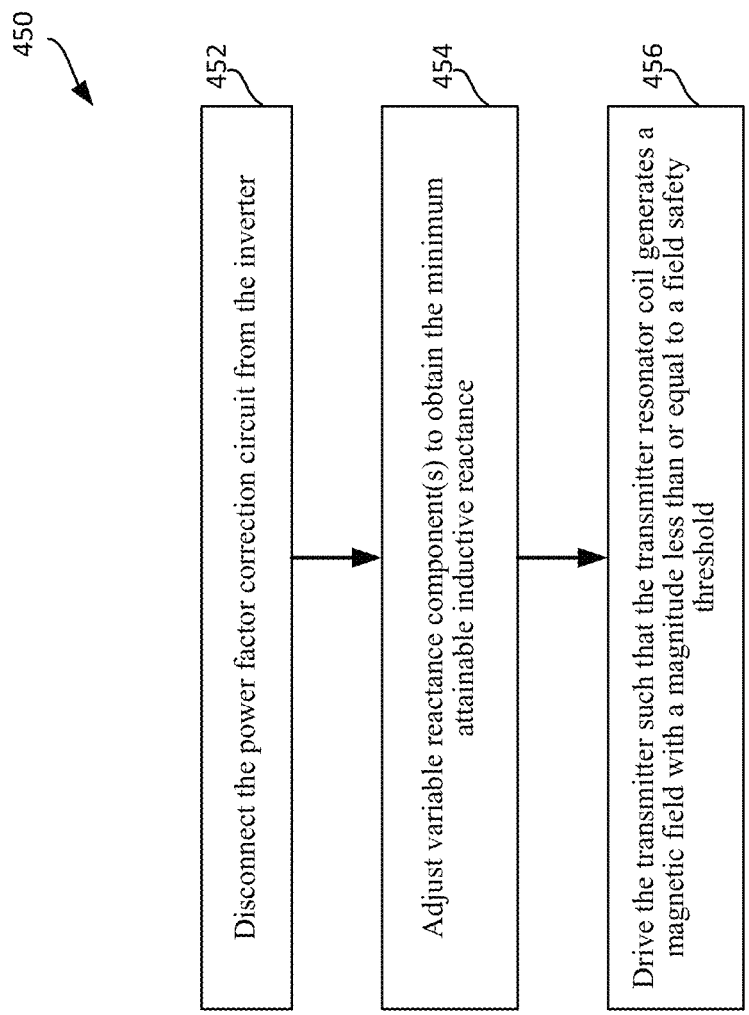
FIG. 4B is a flowchart of an exemplary method for low-power excitation of the exemplary wireless power transmitter of FIG. 4A.

FIG. 4A is a schematic of an exemplary wireless power transmitter 400 including a low-power excitation (LPE) circuit 402. FIG. 4B is a flowchart of an exemplary method 450 for low-power excitation of the wireless power transmitter 400. In this exemplary embodiment, the LPE circuit 402 includes a variable voltage source 404, diode D1, and relays 408a, 408b. The exemplary variable voltage source 404 can be coupled in parallel between the PFC circuit 106 and inverter 108. The PFC circuit 106 can receive power directly or indirectly from a power source (e.g., an AC power mains, a battery, etc.) and provide the necessary power correction for the wireless power transmitter 400 during wireless power transmission (WPT) mode. As discussed above, during WPT mode, the wireless power transmitter 400 may be operating at significantly high power, voltage, and/or current levels as compared to operation during LPE mode. Note that, in WPT mode, the gates G1, G2, G3, G4 of transistors Q1, Q2, Q3, Q4 of inverter 108 are driven by gate drivers 418. The gate drivers 418 can receive PWM signals PWM1, PWM2, PWM3, PWM4 generated by PWM generator 422. The PWM generator 422 can receive control signals, e.g., signals representing phase shift angle for PWM signals, from the digital controller 424.

The exemplary variable voltage source 404 can be coupled in series with diode D1 to block strong currents such that, during wireless power transmission (WPT) mode, the variable voltage source 404 is not harmed by the significant power, current and/or voltage from the PFC circuit 106. The diode D1 and relay can enable current flow in one direction and can be beneficial in enabling the voltage source 404 in driving the transmitter 102. The relay may be used to de-energize the inverter bias and other power electronics of the transmitter 102. During WPT mode, PFC circuit 106 can be enabled (e.g., turned on) by one or more components (e.g., source electronics power controller (SEPC) 410) of the control system 412. In this exemplary embodiment, in WPT mode, the control system 412 may also send a signal to relay 408a to close the circuit between the PFC circuit 106 and the inverter 108. Note that, in WPT mode, the control system 412 may send a signal to relay 408b to open so as to switch out the variable voltage source 404 to avoid harm to source 404 and/or avoid open inefficiencies in the power path driving wireless power transmission.

Referring to step 452 of method 450, in LPE mode, the PFC circuit 106 can be disconnected from the inverter 108. For example, one or more components (e.g., SEPC 410) of the control system 412 can send a control signal to the relays 408a, 408b to open the circuit such that the PFC circuit 106 is disconnected (and therefore unable to drive the transmitter 400). In some embodiments, SEPC 410 can communicate with a zero-voltage switching (ZVS) error generation module 414. In WPT mode, The ZVS error generation module 414 is a protection mechanism that produces a flag and disables power transmission if the phase angle between the inverter output voltage and current is below 12 degrees. This error is intended to protect the system from lossy operation of the semiconductor(s) that could result in failure. In LPE mode, the ZVS error generation can be disabled because the voltage-current (VI) phase seen by the inverter 108 is expected to be below the threshold for ZVS detection. In LPE mode, this condition is acceptable because the power being processed by the inverter 108 is very small, so the switching losses are not destructive.

SEPC 410 can receive signal Ils_ref directly or indirectly from current sensor 416. The signal Ils_ref is a reference signal based on the current measurement Ils by sensor 416 coupled (e.g., in series, in parallel, inductively, etc.) with transmitter resonator coil 202.

In step 454, the impedance of one or more variable impedance components (e.g., reactance of TMN) 406 of the impedance network can be adjusted to obtain the minimum inductive reactance the particular TMN components can attain. For example, upper branch component labelled "X3sa_minΩ–X3sa_maxΩ" and/or lower branch component labelled "X3sb_minΩ–X3sb_maxΩ" can be adjusted to obtain the desired impedance (e.g., minimum reactance). The TMN components 406 can be adjusted by one or more components (e.g., tunable X3S controller 420, SEPC 410, etc.) of the control system 412. For example, the tunable components 406 can be adjusted by a controller 420 that receives a signal (e.g., signal "LPE ON/OFF") from SEPC 410 to adjust components 406 to attain minimum reactance during LPE mode (e.g., when SEPC 410 has disabled PFC circuit 106 and enabled variable voltage source 404).

In step 456, the variable voltage source 404 drives the transmitter 400 such that the current in the transmitter resonator coil 202 is within the target current range for LPE mode. To do so, SEPC 410 can send one or more signals to close relay 408b and enable variable voltage source 404. In this embodiment, the inverter is enabled to convert the constant (DC) voltage into high frequency oscillating (AC) voltage. In some embodiments, the method 450 includes receiving, by SEPC 410, current signal from the sensor 416 to indicate whether that the current is in the target range (e.g., less than 1 A, less than 3 A, less than 5 A, etc.) for LPE mode.

LPE—Second Exemplary Embodiment

Figure 5A:
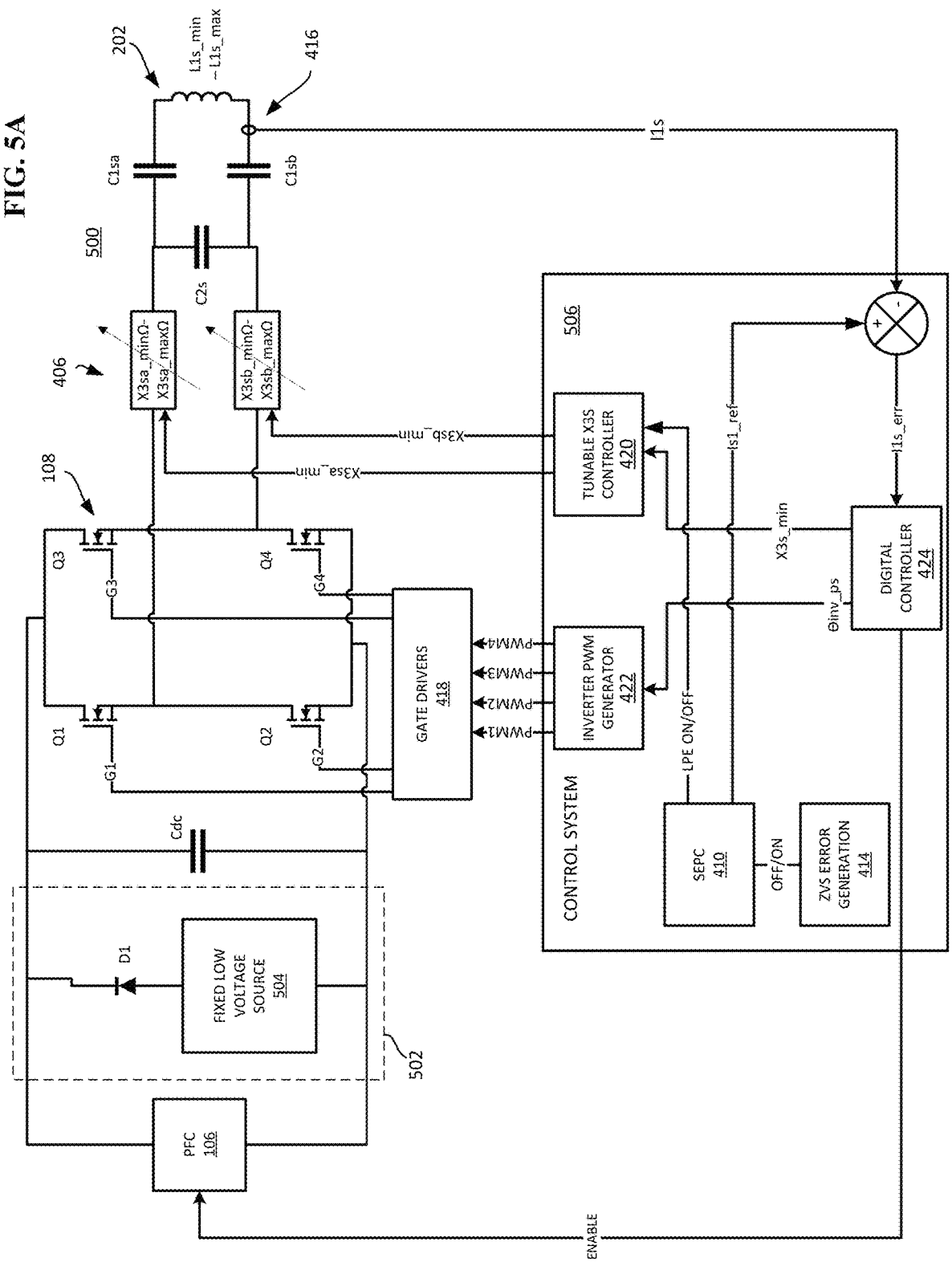
FIG. 5A is a schematic of an exemplary wireless power transmitter configured for low-power excitation.
Figure 5B:
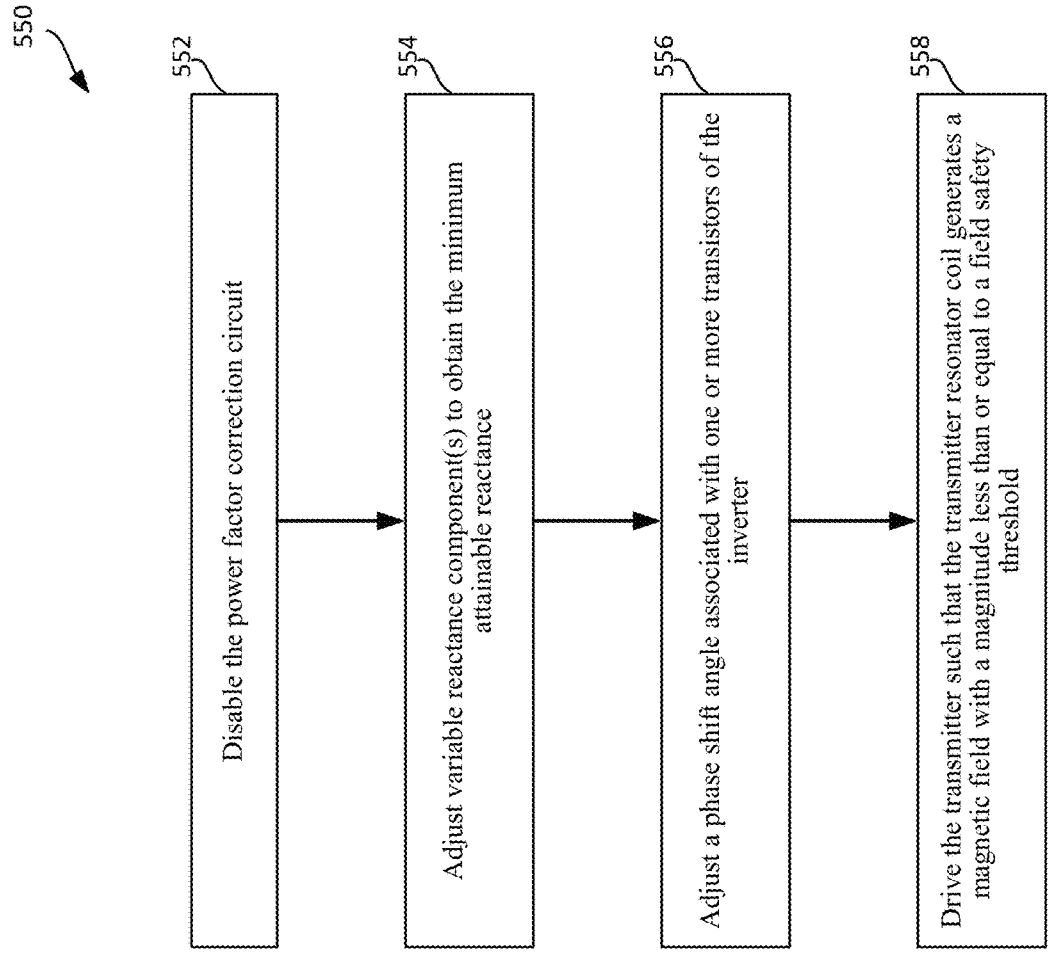
FIG. 5B is a flowchart of an exemplary method for low-power excitation of the exemplary wireless power transmitter of FIG. 5A.

FIG. 5A is a schematic of an exemplary wireless power transmitter 500 including a low-power excitation (LPE) circuit 502. FIG. 5B is a flowchart of an exemplary method 550 for low-power excitation of transmitter 500. Specifically, the system 502 includes a fixed low-voltage source 504 coupled in series with diode D1. In this embodiment, the fixed low-voltage source 504 can be on (operable) during both LPE mode and WPT mode. In some embodiments, the fixed low-voltage source 504 is hard-wired into the circuitry of the transmitter 500.

In step 552 of method 550, in LPE mode, the PFC circuit 106 is disabled. For example, one or more components (e.g., digital controller 424) of the control system 506 can send a signal to enable or disable the PFC circuit 106 upon entering LPE mode. Note that, as described above, in LPE mode, the ZVS error generation 414 can be disabled.

In step 554, the impedance of one or more variable impedance components 406 (e.g., reactance of TMN) 406 can be adjusted so as to obtain the minimum reactance (e.g., minimum inductive reactance) the particular TMN components 406 can attain. For example, upper branch component labelled "X3sa_minΩ–X3sa_maxΩ" and/or lower branch component labelled "X3sb_minΩ–X3sb_maxΩ" can be adjusted to obtain the desired impedance (e.g., minimum reactance). The TMN components 406 can be adjusted by one or more components (e.g., digital controller 424, tunable X3S controller 420, SEPC 410, etc.) of the control system 506. For example, controller 420 can receive a signal X3s_min from the digital controller 424 indicating that the reactance should be adjusted to the minimum attainable reactance. This can have the effect of minimizing variation in the current in transmitter resonator coil 202 over coupling range of the resonator coils. Referring to FIG. 1B, coupling range can be based on one or more positions of the receiver resonator coil 204 relative to the transmitter resonator coil 202. In some embodiments, the method 550 can include receiving a signal representing a current characteristic (e.g., level, phase, frequency) from sensor 416. This signal can be provided to the control system 506 for confirming the current characteristic in coil 202.

In step 556, any remaining variation in the coil current can be minimized by adjusting the phase shift angle(s) of the pulse width modulation (PWM) signals for transistors of the inverter 108. The PWM signals can be provided to the inverter 108 by one or more components of the control system 506. Specifically, the digital controller 424 can send a signal θinv_ps to the PWM generator 422 to generate specific PWM signals PWM1, PWM2, PWM3, PWM4 for gate drivers 418. The drivers 418 can then drive gates G1, G2, G3, G4 corresponding to respective transistors Q1, Q2, Q3, Q4 of the inverter 108.

Figure 5C:
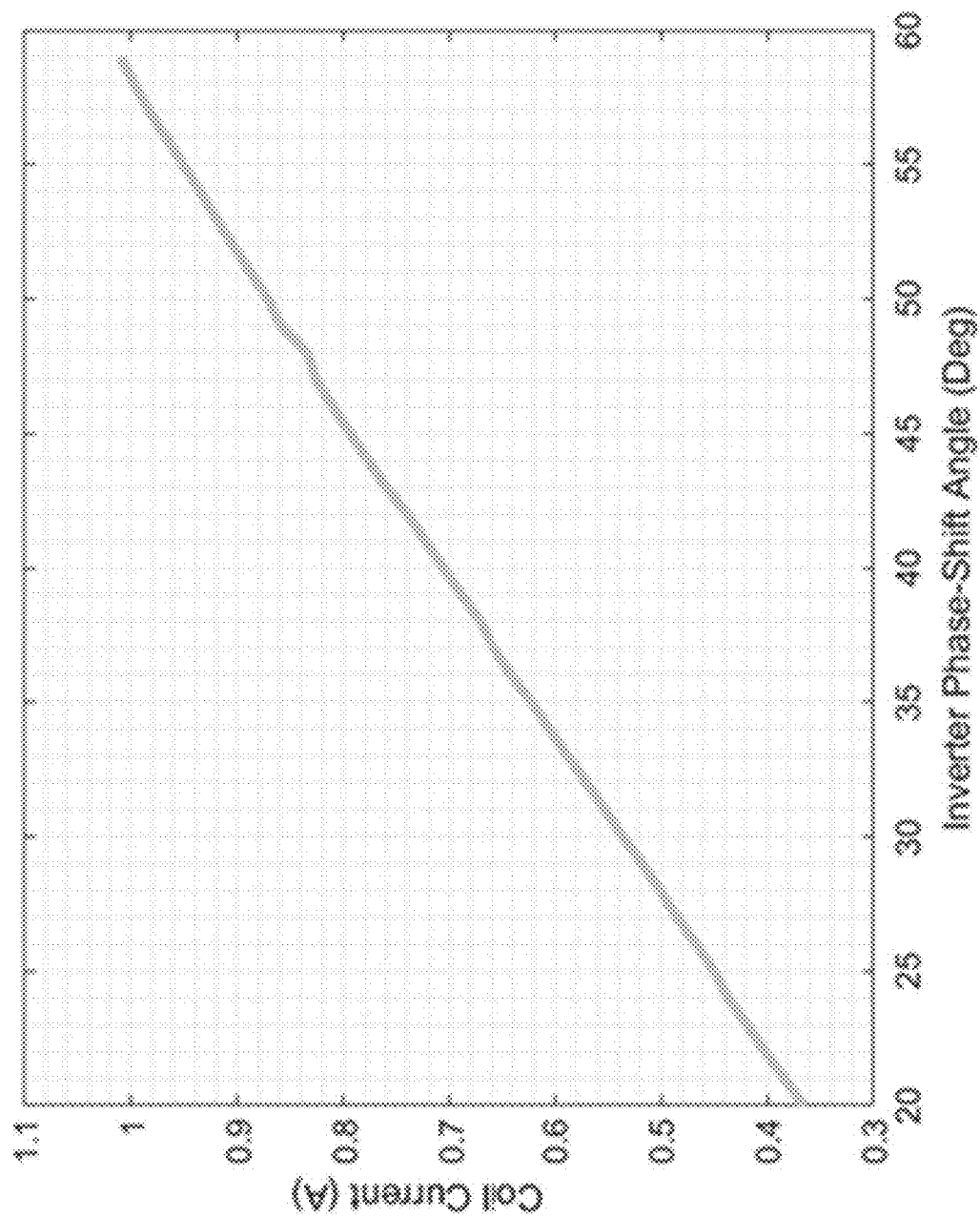
FIG. 5C is a plot of transmitter coil current (in Amperes) as a function of inverter phase shift angle (in degrees).

In some embodiments, the phase shift angle may be adjusted between 0 and 180 degrees such that the magnetic flux density is less than or equal to the field safety threshold. This can include adjusting the phase shift angle to adjust the current level to attain a magnetic flux density at or below the field safety threshold. In particular, referring to FIG. 5C, the relationship between the coil current and the phase shift angle is approximately linear and monotonic. Using this relationship, by determining the coil current and/or the magnetic flux density, a negative feedback can be provided to the controller to adjust the phase shift angle so as to reject disturbances in the transmitter coil current. Note that the transmitter coil current can be based on a voltage induced in a loop near the transmitter resonator coil 202. The coil current can be determined via the following relationship:

$$I_{1s} = \frac{V_{ind}}{\omega M}$$

In some embodiments, the source 504 can drive the transmitter at 30 V or less. For example, to obtain an approximate coil current of 1 $A_{RMS}$ using a fixed voltage level of approximately 12 V produced by the source 504, the inverter phase shift angle can be adjusted to approximately 60 degrees by control system 506.

LPE—Third Exemplary Embodiment

Figure 6A:
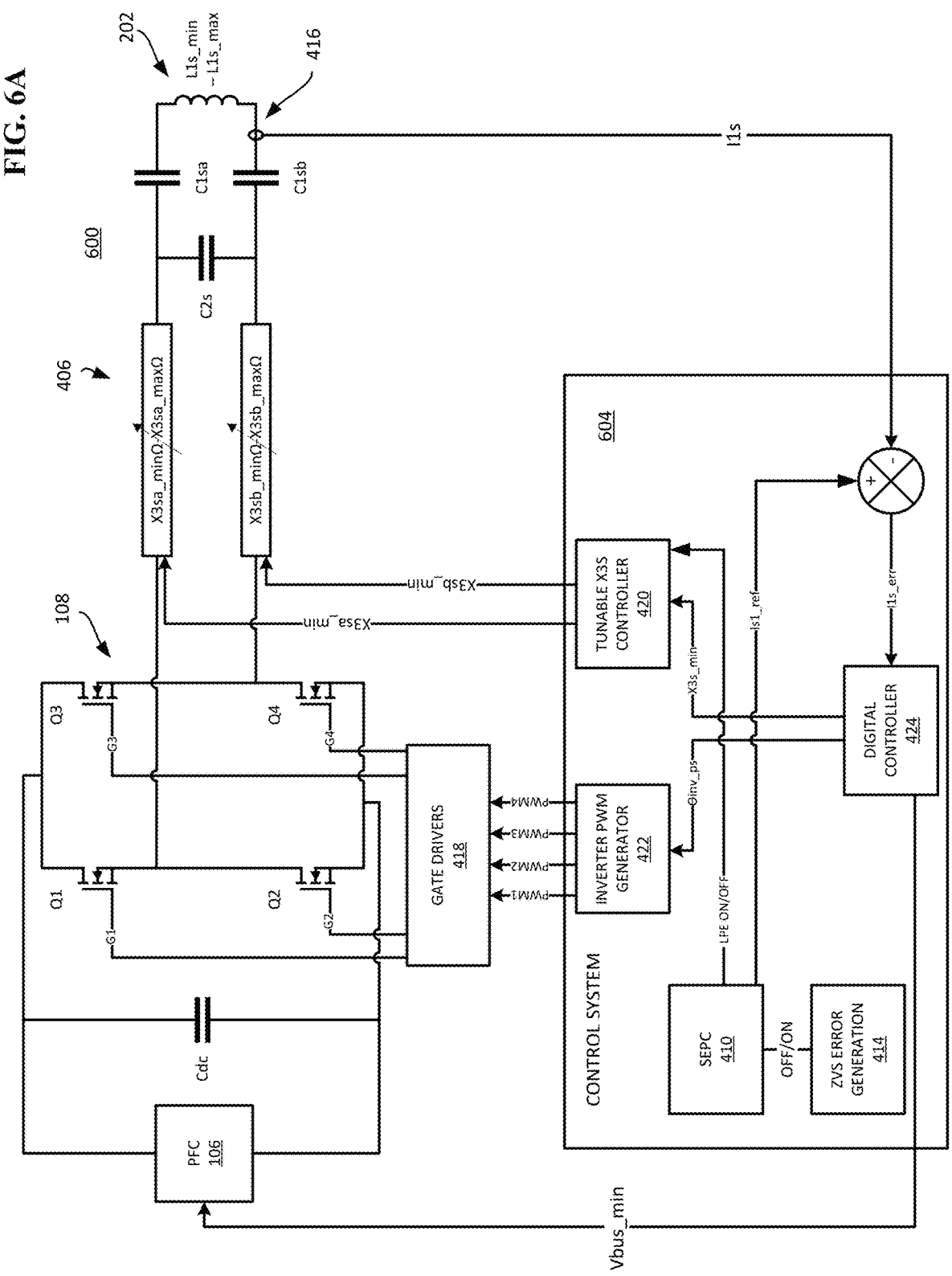
FIG. 6A is a schematic of an exemplary wireless power transmitter configured for low power excitation.
Figure 6B:
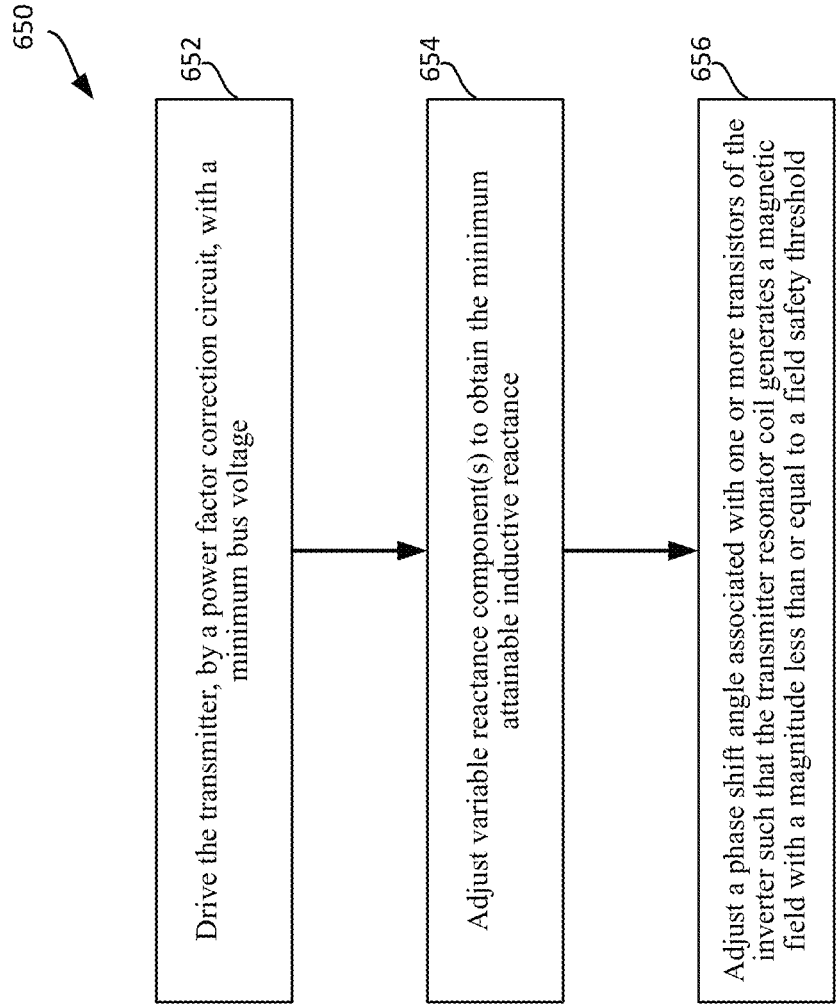
FIG. 6B is a flowchart of an exemplary method for low-power excitation of the exemplary wireless power transmitter of FIG. 6A.

FIG. 6A is a schematic of an exemplary wireless power transmitter 600 configured for low power excitation. FIG. 6B is a flowchart of an exemplary method 650 for low-power excitation of transmitter 600.

In step 652 of method 650, the PFC circuit 106 can be configured to drive the transmitter at a bus voltage $V_{BUS}$. The PFC circuit 106 can be configured to output a bus voltage between a minimum voltage $V_{BUS\_min}$ and a maximum voltage $V_{BUS\_max}$. In some embodiments, during LPE mode, the bus voltage $V_{BUS}$ is equal to the minimum bus voltage $V_{BUS\_min}$ that the particular PFC circuit 106 is configured to output. For example, one or more components (e.g., digital controller 424) of controller 604 can send a signal to the PFC circuit 106 to adjust the voltage to the minimum bus voltage $V_{BUS\_min}$. Note that, as described above, in LPE mode, the ZVS error generation 414 can be disabled.

In step 654, the impedance of one or more variable impedance components (e.g., the reactance of the TMN) 406 can be adjusted to obtain the minimum reactance (e.g., minimum inductive reactance) the particular TMN components 406 can attain. For example, upper branch component labelled "X3sa_minΩ–X3sa_maxΩ" and/or lower branch component labelled "X3sb_minΩ–X3sb_maxΩ" can be adjusted to obtain the desired impedance (e.g., minimum reactance). The TMN components 406 can be adjusted by one or more components (e.g., digital controller 424, tunable X3S controller 420, SEPC 410, etc.) of the control system 604. For example, controller 420 can receive a signal X3s_min from the digital controller 424 indicating that the reactance should be adjusted to the minimum attainable reactance. This has the effect of minimizing variation in the coil current over coupling range of the resonator coils.

In step 656, any remaining variation in the coil current can be minimized by adjusting the phase shift of the pulse width modulation (PWM) signals inputted to each of the transistors of the inverter 108. The PWM signals can be provided to the inverter 108 by one or more components of the control system 604. Specifically, the digital controller 424 can send a signal to the PWM generator 422 to generate specific PWM signals PWM1, PWM2, PWM3, PWM4 for gate drivers 418. The drivers 418 can then drive gates G1, G2, G3, G4 corresponding to respective transistors Q1, Q2, Q3, Q4 of the inverter 108. For example, to produce an approximate coil current of 1 $A_{RMS}$ at a voltage level of approximately 380 V as produced by the PFC circuit 106, the inverter phase shift angle can be adjusted to below approximately 5 degrees by controller 604.

LPE—Fourth Exemplary Embodiment

Figure 7A:
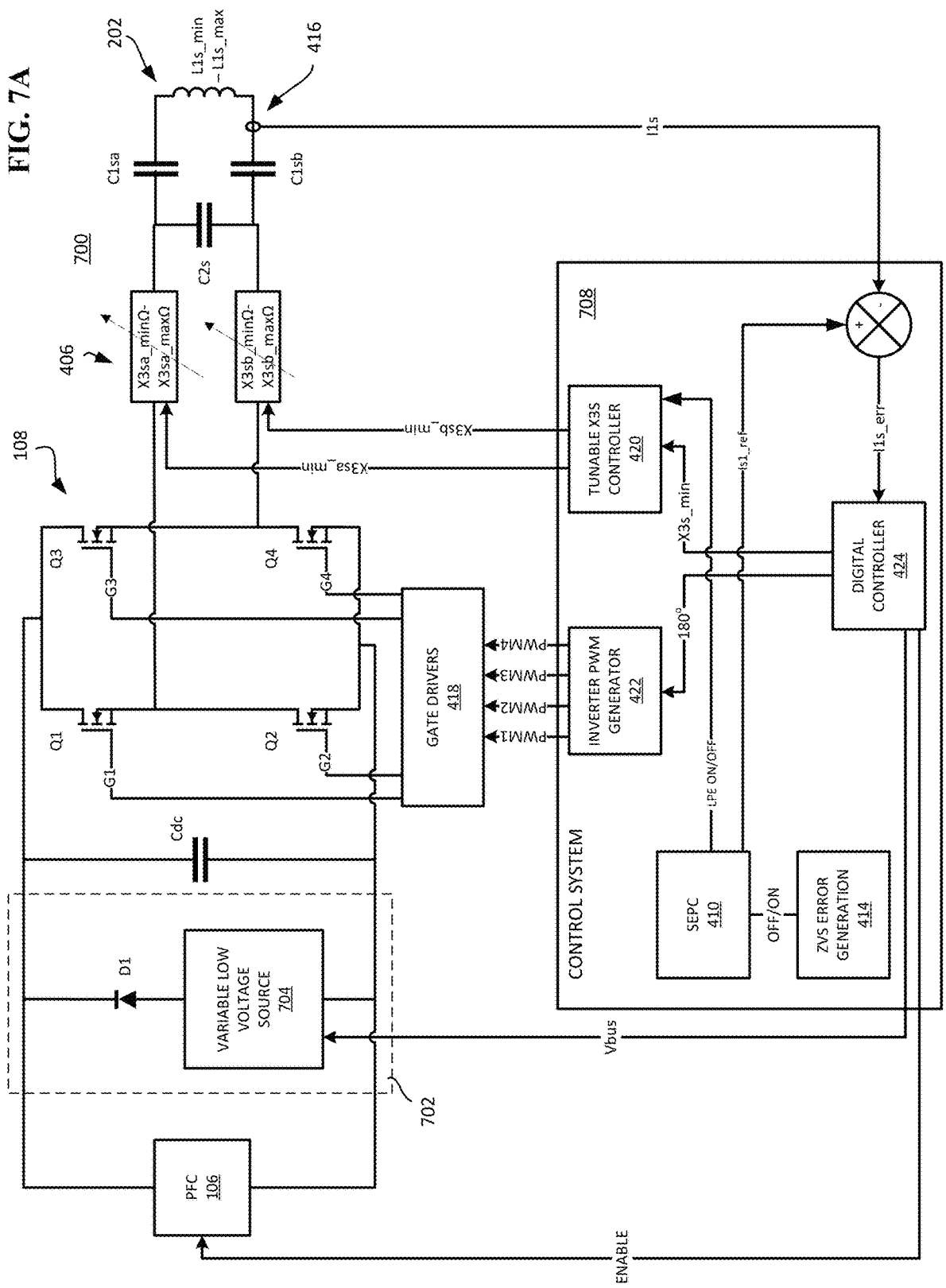
FIG. 7A is a schematic of an exemplary wireless power transmitter configured for low-power excitation.
Figure 7B:
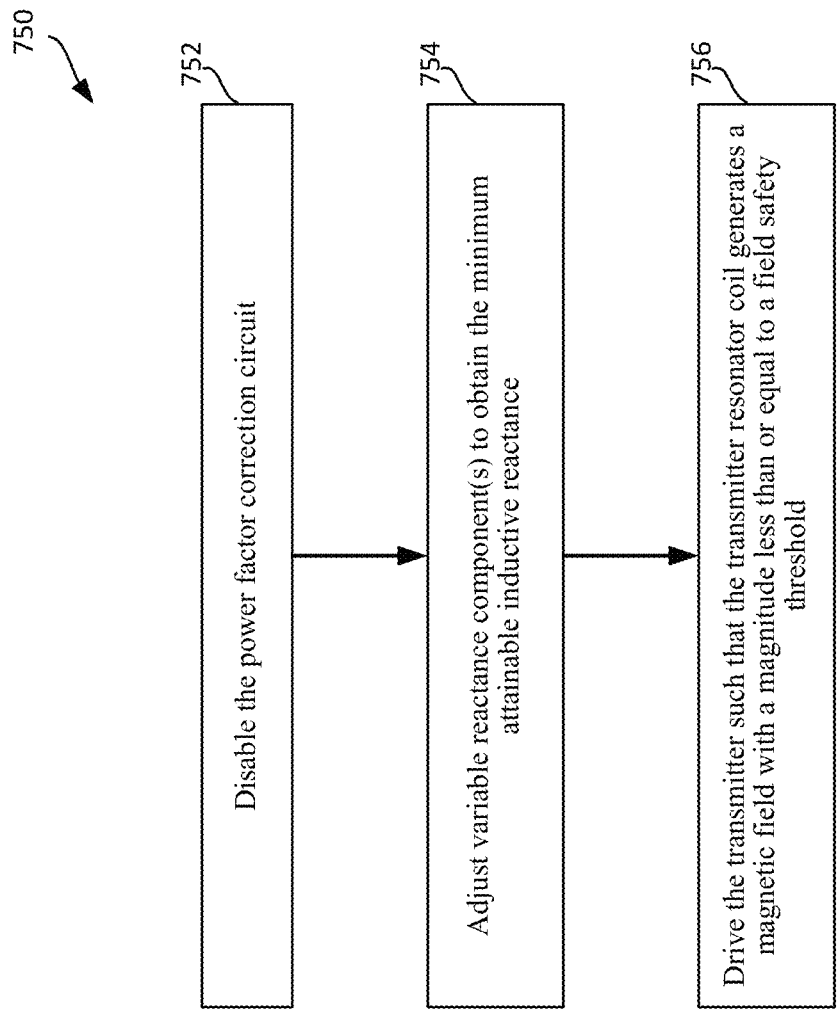
FIG. 7B is a flowchart of an exemplary method for low-power excitation of the exemplary wireless power transmitter of FIG. 7A.

FIG. 7A is a schematic of an exemplary wireless power transmitter 700 including a low-power excitation (LPE) circuit 702. FIG. 7B is a flowchart of an exemplary method 750 for low-power excitation of transmitter 700. The LPE circuit 702 includes a variable low-voltage source 704 coupled in series with diode D1. The LPE circuit 702 is coupled in parallel between the PFC circuit 106 and inverter 108. The variable low voltage source 704 is configured to receive a signal representing a level of bus voltage $V_{BUS}$ from digital controller 424. The controller 424 can determine the $V_{BUS}$ for the source 704 to output during LPE mode. In some embodiments, the controller 424 can be configured to time the signals to the PFC circuit 106 and the source 704 to ensure that the PFC circuit 106 is disabled before or at the same time the voltage source 704 is turned on. Note that, in this embodiment, the phase shift of the PWM signals (e.g., PWM1, PWM2, PWM3, PWM4) inputted to each of the transistors Q1, Q2, Q3, Q4 of the inverter 108 can be fixed.

In step 752, during the LPE mode, the PFC circuit 106 is disabled. In some embodiments, one or more components (e.g., digital controller 424) of a control system 708 is configured to transmit a signal to the PFC circuit 106 to enable or disable the PFC circuit 106. For example, during WPT mode, the PFC circuit 106 is enabled. Note that, as described above, in LPE mode, the ZVS error generation 414 can be disabled.

In step 754, the impedance of one or more variable impedance components (e.g., reactance of TMN) 406 of the impedance network can be adjusted to obtain the minimum inductive reactance the particular TMN can attain. In this example, upper branch component labelled "X3sa_minΩ–X3sa_maxΩ" and/or lower branch component labelled "X3sb_minΩ–X3sb_maxΩ" can be adjusted to obtain the desired impedance (e.g., minimum reactance). The TMN components 406 can be adjusted by one or more components (e.g., tunable X3S controller 420, SEPC 410, etc.) of the control system 412.

In step 756, the variable low voltage source 704 is configured to drive the transmitter 700 such that the transmitter resonator coil 202 generates a magnetic field with a magnitude less than or equal to the field safety threshold. In some embodiments, the source 704 can drive the transmitter 700 with a voltage between approximately 4 V to 5 V. For example, to produce an approximate coil current of 1 $A_{RMS}$ at a fixed phase shift angle, the voltage level of the variable low voltage source is adjusted to between approximately 4 V to 5 V.

Vehicle Positioning

The low power excitation components, systems, and methods disclosed herein can form a portion of a wireless power system 100 that implements various other performance and safety verifications prior to, during, or after wireless power transmission.

Figure 8:
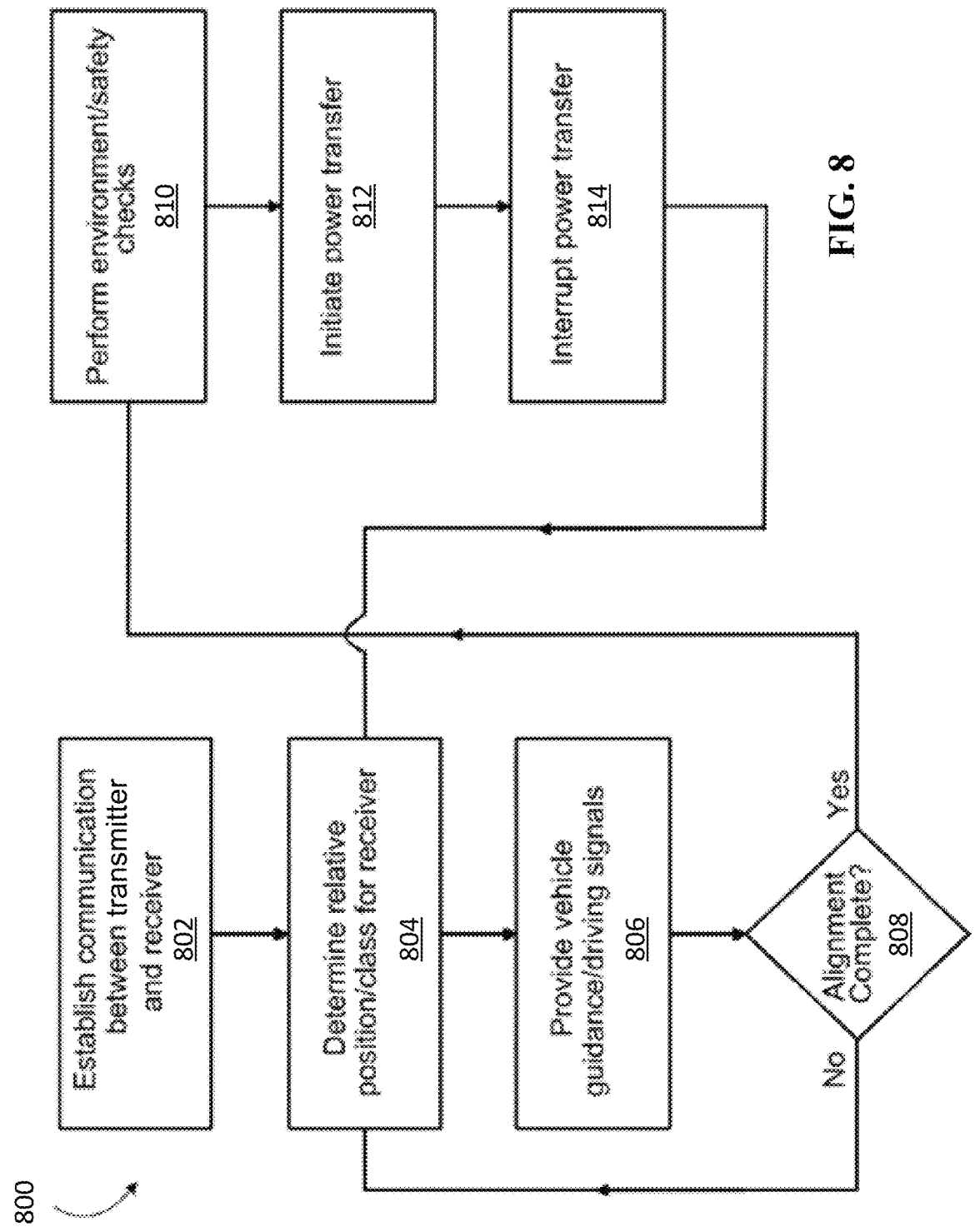
FIG. 8 is a flowchart showing a series of example steps for performing wireless power transmission from a transmitter to a receiver, including vehicle positioning.

FIG. 8 is a flowchart 800 showing one example of a series of steps that can be executed in a wireless power system 100 prior to and/or during wireless power transfer. In step 802, a communication link is established between wireless power transmitter 102 and wireless power receiver 104. The link can be established, for example, over a Wi-Fi network or communication protocol, over a Bluetooth® connection, or more generally, over any link, connection, or communication protocol by which the transmitter 102 and receiver 104 can communicate.

Next, in step 804, the system processor (e.g., any of the processors disclosed herein, or another processor that communicates with the processors disclosed herein) determines the relative position of wireless power receiver 104 and/or the class associated with the receiver's relative position, using any of the methods disclosed herein. Then system processor generates a signal that includes information about the receiver's relative position and/or class, and transmits the signal to another processor, controller, or display interface.

In optional step 806, the system (i.e., the system processor or another processor, circuit, or controller) can provide vehicle guidance information to a vehicle operator or autonomous driving system using the information from the transmitted signal. In some embodiments, this step can include displaying indicators on a vehicle display unit to provide the guidance information.

Next, in step 808, the system determines whether alignment is complete based on the relative position, or class of the relative position, of the wireless power receiver 104, i.e., whether the wireless power receiver 104 is within a predetermined distance of the wireless power transmitter 102, or whether the wireless power receiver 104 is assigned to a particular class. If alignment has not been achieved, control returns to step 804; if alignment has been achieved, control passes to step 810.

In optional step 810, the system performs additional environmental and safety checks. These can include, for example, checking for foreign objects, checking for living objects, checking for motion of the vehicle/receiver, and monitoring/checking various other safety systems and operating parameters. If all checks and systems are satisfied, then in step 812, power transfer is initiated from wireless power transmitter 102 to wireless power receiver 104.

After a period of time has elapsed, wireless power transmission may optionally be interrupted at step 814. A variety of criteria and/or signals can lead to interruption of power transmission. In some embodiments, for example, power transmission can be interrupted periodically to perform additional system checks. In certain embodiments, power transmission can be interrupted when a system sensor generates a signal indicating an irregular event, such as an unexpected acceleration of the vehicle/receiver, a change in capacitance of the vehicle/receiver, and/or a change in position of the vehicle receiver. In some embodiments, power transmission can also be interrupted when certain system operating/performance parameters change, such as the voltage and/or current induced in the wireless power receiver.

After power transmission has been interrupted, control returns to step 804 to perform an alignment check to ensure that the wireless power transmitter 102 and receiver 104 remain aligned. If aligned, and if the environmental and safety checks are passed in step 810, control eventually returns to step 812 and power transmission is re-initiated.

Hardware and Software Implementations

Figure 9:
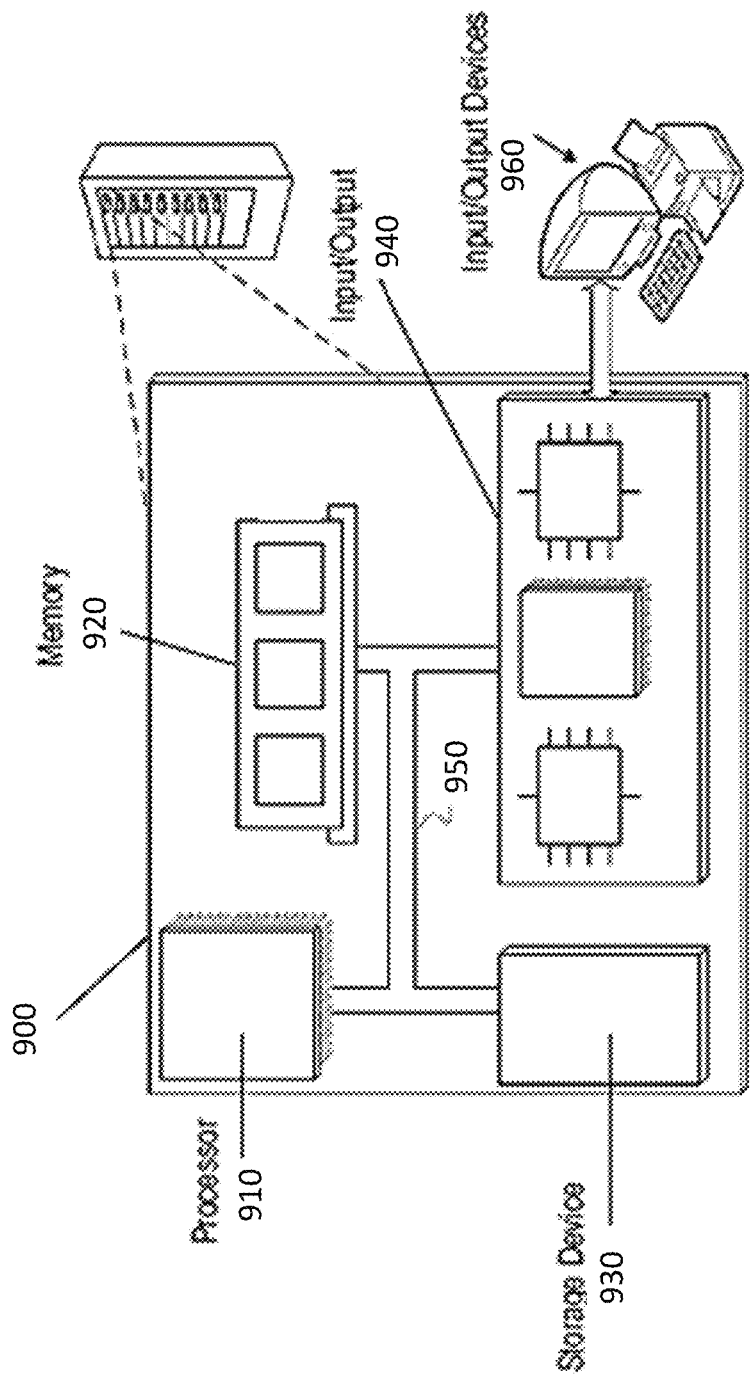
FIG. 9 is a block diagram of an example computer system that may be used in implementing the systems and methods described herein.

FIG. 9 is a block diagram of an example computer system 900 that may be used in implementing the systems and methods described herein. General-purpose computers, network appliances, mobile devices, or other electronic systems may also include at least portions of the system 900. The system 900 includes a processor 910, a memory 920, a storage device 930, and an input/output device 940. Each of the components 910, 920, 930, and 940 may be interconnected, for example, using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930.

The memory 920 stores information within the system 900. In some implementations, the memory 920 is a non-transitory computer-readable medium. In some implementations, the memory 920 is a volatile memory unit. In some implementations, the memory 920 is a nonvolatile memory unit. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

The storage device 930 is capable of providing mass storage for the system 900. In some implementations, the storage device 930 is a non-transitory computer-readable medium. In various different implementations, the storage device 930 may include, for example, a hard disk device, an optical disk device, a solid-date drive, a flash drive, or some other large capacity storage device. For example, the storage device may store long-term data (e.g., database data, file system data, etc.). The input/output device 940 provides input/output operations for the system 900. In some implementations, the input/output device 940 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 960. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 930 may be implemented in a distributed way over a network, such as a server farm or a set of widely distributed servers, or may be implemented in a single computing device.

Although an example processing system has been described in FIG. 9, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A wireless power transmitter configured to transmit high power to a wireless power receiver, the transmitter comprising:
    a DC voltage bus;
    an inverter including at least two transistors, the inverter having an input coupled to the DC voltage bus;
    at least one variable impedance component coupled to an output of the inverter;
    a resonator coil configured to generate a magnetic flux density; and
    at least one controller configured to:
        determine whether the transmitter is aligned with the receiver;
        operate, in response to a determination that the transmitter is not aligned with the receiver, the transmitter in a low power excitation (LPE) mode; and
        adjust, during the LPE mode, at least one of a voltage level of the DC voltage bus, a phase shift angle associated with at least one transistor of the inverter, or an impedance of the at least one variable impedance component such that the magnetic flux density generated by the resonator coil is less than or equal to a field safety threshold.

2. The wireless power transmitter of claim 1, further comprising a power factor correction (PFC) circuit having an output coupled to the DC voltage bus.

3. The wireless power transmitter of claim 2, further comprising a low voltage source coupled to the DC voltage bus, wherein adjusting the voltage level of the DC voltage bus during the LPE mode includes disabling the PFC circuit and providing DC power from the low voltage source to the DC voltage bus.

4. The wireless power transmitter of claim 3, wherein the low voltage source is one of a variable low voltage source or a fixed low voltage source.

5. The wireless power transmitter of claim 2, wherein adjusting the voltage level of the DC voltage bus during the LPE mode includes controlling the PFC circuit to output a minimum bus voltage, the PFC circuit being configured to output a bus voltage between the minimum bus voltage and a maximum bus voltage.

6. The wireless power transmitter of claim 1, wherein the at least one controller is further configured to:
operate, in response to a determination that the transmitter is aligned with the receiver, the transmitter in a wireless power transmission (WPT) mode.

7. The wireless power transmitter of claim 6, wherein the transmitter is configured to transmit power at a power level between 500 W and 20,000 W in the WPT mode.

8. The wireless power transmitter of claim 1, wherein the transmitter is configured to transmit power at a power level between 1 W and 50 W in the LPE mode.

9. The wireless power transmitter of claim 1, wherein determining whether the transmitter is aligned with the receiver includes performing at least one of an environmental check or a safety check.

10. The wireless power transmitter of claim 1 further comprising:
a controller operably coupled to at least one of: (i) the at least two transistors or (ii) the at least one variable impedance component; and
a current sensor coupled to the resonator coil and configured to provide a signal representative of at least one characteristic of a current in the resonator coil to the controller, the at least one characteristic including a level, a phase, and/or a frequency of the current in the resonator coil.

11. A method for low power excitation of a wireless power transmitter configured to transmit high power to a wireless power receiver, the transmitter including a DC voltage bus, an inverter having an input coupled to the DC voltage bus, at least one variable impedance network coupled to an output of the inverter, and a resonator coil configured to generate a magnetic flux density, the method comprising:
determining whether the transmitter is aligned with the receiver;
operating, in response to a determination that the transmitter is not aligned with the receiver, the transmitter in a low power excitation (LPE) mode; and
adjusting, during the LPE mode, at least one of a voltage level of the DC voltage bus, a phase shift angle associated with at least one transistors of the inverter, or an impedance of the at least one variable impedance component such that the magnetic flux density generated by the resonator coil is less than or equal to a field safety threshold.

12. The method of claim 11, wherein the transmitter includes a power factor correction (PFC) circuit having an output coupled to the DC voltage bus.

13. The method of claim 12, wherein the transmitter includes a low voltage source coupled to the DC voltage bus, wherein adjusting the voltage level of the DC voltage bus during the LPE mode includes disabling the PFC circuit and providing DC power from the low voltage source to the DC voltage bus.

14. The method of claim 13, wherein the low voltage source is one of a variable low voltage source and a fixed low voltage source.

15. The method of claim 12, wherein adjusting the voltage level of the DC voltage bus during the LPE mode includes controlling the PFC circuit to output a minimum bus voltage, the PFC circuit being configured to output a bus voltage between the minimum bus voltage and a maximum bus voltage.

16. The method of claim 11, further comprising:
operating, in response to a determination that the transmitter is aligned with the receiver, the transmitter in a wireless power transmission (WPT) mode.

17. The method of claim 16, wherein the transmitter is configured to transmit power at a power level between 500 W and 20,000 W in the WPT mode.

18. The method of claim 11, wherein the transmitter is configured to transmit power at a power level between 1 W and 50 W in the LPE mode.

19. The method of claim 11, wherein the transmitter includes a controller operably coupled to at least one of: (i) the at least two transistors or (ii) the at least one variable impedance component, and a current sensor coupled to the resonator coil, the method further comprising:
providing, via the current sensor, a signal representative of at least one characteristic of the current in the resonator coil to the controller, the at least one characteristic including a level, a phase, and/or a frequency of the current in the resonator coil.

20. The method of claim 11, wherein determining whether the transmitter is aligned with the receiver includes performing at least one of an environmental check or a safety check.

21. The wireless power transmitter of claim 1, wherein the transmitter is configured to operate in the LPE mode when in the presence of the receiver.

22. The method of claim 11, wherein the transmitter is configured to operate in the LPE mode when in the presence of the receiver.

* * * * *